(12) United States Patent
Fukumoto et al.

(10) Patent No.: US 11,482,933 B2
(45) Date of Patent: Oct. 25, 2022

(54) SWITCHING POWER SUPPLY DEVICE

(71) Applicant: Rohm Co., Ltd., Kyoto (JP)

(72) Inventors: Yosuke Fukumoto, Kyoto (JP); Shun Fukushima, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 73 days.

(21) Appl. No.: 17/178,768

(22) Filed: Feb. 18, 2021

(65) Prior Publication Data

US 2021/0257913 A1 Aug. 19, 2021

(30) Foreign Application Priority Data

Feb. 19, 2020 (JP) .............................. JP2020-025826

(51) Int. Cl.
*H02M 3/158* (2006.01)
*H02M 1/08* (2006.01)
*H02M 1/00* (2006.01)

(52) U.S. Cl.
CPC ........... *H02M 3/1588* (2013.01); *H02M 1/08* (2013.01); *H02M 1/0045* (2021.05)

(58) Field of Classification Search
CPC .... H02M 3/1588; H02M 1/08; H02M 1/0045; H02M 1/0022; H02M 1/325; H02M 3/158
See application file for complete search history.

(56) References Cited

U.S. PATENT DOCUMENTS

| 8,169,207 | B2* | 5/2012 | Omi | H02M 3/156 323/284 |
| 8,582,259 | B2* | 11/2013 | Murakami | H02M 3/156 361/56 |
| 10,075,073 | B2* | 9/2018 | Guan | G05F 1/46 |
| 10,892,681 | B2* | 1/2021 | Fukushima | H02M 3/158 |

FOREIGN PATENT DOCUMENTS

JP 2012-114987 6/2012

* cited by examiner

*Primary Examiner* — Kyle J Moody
(74) *Attorney, Agent, or Firm* — Fish & Richardson P.C.

(57) ABSTRACT

There is provided a switching power supply device, including: an output stage circuit including an output transistor installed between an application end of an input voltage and an application end of an output voltage, and configured to generate the output voltage from the input voltage through a switching operation including an operation of switching the output transistor; and a main control circuit configured to execute PWM control for causing the output stage circuit to perform the switching operation at a predetermined PWM frequency based on a feedback voltage according to the output voltage.

10 Claims, 14 Drawing Sheets

When Vin = 10 V (on-duty = 50%)

When Vin = 20 V (on-duty = 25%)

SWITCHING POWER SUPPLY DEVICE

CROSS-REFERENCE TO RELATED APPLICATION

This application is based upon and claims the benefit of priority from Japanese Patent Application No. 2020-025826, filed on Feb. 19, 2020, the entire contents of which are incorporated herein by reference.

TECHNICAL FIELD

The present disclosure relates to a switching power supply device.

BACKGROUND

In related art, switching power supply device that includes an output transistor provided between an input voltage application end and an output voltage application end, and that switches the output transistor based on a feedback voltage according to the output voltage is generally known. A current mode control method is often adopted in the switching control.

FIG. 19 shows a configuration of a switching power supply device 900 according to a reference configuration in which a current mode control method is adopted. The switching power supply device 900 is configured as a step-down switching power supply device that generates a desired output voltage Vo from an input voltage Vi. In the switching power supply device 900 of FIG. 19, a rectangular wave-shaped voltage is generated by switching the input voltage Vi through the use of an output stage circuit including an output transistor 911 and a synchronous rectification transistor 912. The output voltage Vo is generated by smoothing the rectangular wave-shaped voltage through the use of a coil 913 and an output capacitor 914. At this time, a comparison voltage Vc' is generated based on the feedback voltage according to the output voltage Vo and the current flowing through the coil 913, and a pulse width modulation signal Spwm' is generated by comparing the comparison voltage Vc' with a ramp voltage Vramp'. By switching the transistors 911 and 912 by PWM control using the pulse width modulation signal Spwm', the output voltage Vo can be stabilized at a desired target voltage. In the configuration of FIG. 19, the comparison voltage Vc' increases as the output voltage Vo decreases. A phase compensation circuit 920 for compensating for the phase of the comparison voltage Vc' is connected to a wiring 921 to which the comparison voltage Vc' is applied. The phase compensation circuit 920 is formed of a series circuit of a phase compensation resistor 921a and a phase compensation capacitor 921b.

The input voltage Vi is basically higher than the target voltage as the output voltage Vo. However, depending on the application, the input voltage Vi may be temporarily lowered to a level lower than the target voltage. When the input voltage Vi drops to below the target voltage, the output voltage Vo also drops in conjunction therewith. The drop in the output voltage Vo brings about an increase in the comparison voltage Vc'. At this time, a clamp circuit 930 may be introduced so that the comparison voltage Vc' does not rise excessively.

The clamp circuit 930 is connected to the wiring 921 to which the comparison voltage Vc' is applied. The clamp circuit 930 clamps the comparison voltage Vc' so that the comparison voltage Vc' does not rise beyond a predetermined clamp voltage. In this regard, the clamp voltage needs to be set to a voltage higher than the maximum voltage of the ramp voltage Vramp' so that the PWM control to be executed in the normal operation is not affected. Then, in the switching power supply device 900, when the input voltage Vi is restored after going through a drop in the input voltage Vi, a relatively large overshoot may occur in the output voltage Vo (the cause of the overshoot will be described in detail later).

Since the large overshoot may adversely affect the rear stage circuit of the switching power supply device 900, it is desired to suppress the overshoot as much as possible.

SUMMARY

Some embodiments of the present disclosure provide a switching power supply device capable of contributing to suppression of overshoot (e.g., a switching power supply device capable of contributing to suppression of overshoot which may occur when an input voltage is restored after going through a drop in the input voltage).

According to one embodiment of the present disclosure, there is provided a configuration (first configuration) of a switching power supply device, including: an output stage circuit including an output transistor installed between an application end of an input voltage and an application end of an output voltage, and configured to generate the output voltage from the input voltage through a switching operation including an operation of switching the output transistor; and a main control circuit configured to execute PWM control for causing the output stage circuit to perform the switching operation at a predetermined PWM frequency based on a feedback voltage according to the output voltage, wherein the main control circuit includes a comparison voltage generator configured to generate a comparison voltage on a specific wiring according to the feedback voltage, a phase compensation circuit connected to the specific wiring and configured to compensate a phase of the comparison voltage, a ramp voltage generation circuit configured to generate a ramp voltage whose voltage value is changed periodically in a PWM cycle, and a PWM comparator configured to compare the comparison voltage with the ramp voltage to output a signal indicating a comparison result, wherein the main control circuit is configured to control the output stage circuit based on an output signal of the PWM comparator, wherein the phase compensation circuit includes a phase compensation resistor installed between the specific wiring and a predetermined node, and a phase compensation capacitor installed between the predetermined node and a reference conductive portion having a predetermined potential, and wherein the main control circuit further includes a clamp circuit configured to perform a clamping operation for generating a clamp voltage and clamping a voltage at the predetermined node with the clamp voltage.

According to another embodiment of the present disclosure, there is provided a configuration (second configuration) that in the switching power supply device of the first configuration, the main control circuit is configured to: execute the PWM control or off-skip control for keeping the output transistor in an on-state for more than one cycle of the PWM cycle corresponding to a reciprocal of the PWM frequency; execute the PWM control for causing the output stage circuit to perform the switching operation based on switching of a high-low relationship between the comparison voltage and the ramp voltage in a state in which the comparison voltage is maintained within a fluctuation range of the ramp voltage; execute the off-skip control in a state in which the switching of the high-low relationship between the comparison voltage and the ramp voltage does not occur for one cycle or more of the PWM cycle; and execute the clamping operation in conjunction with the execution of the off-skip control.

According to another embodiment of the present disclosure, there is provided a configuration (third configuration) that in the switching power supply device of the second configuration, upon detecting that the switching of the high-low relationship between the comparison voltage and the ramp voltage does not occur for one cycle of the PWM cycle or more after a start of the PWM control, the main control circuit shifts execution control from the PWM control to the off-skip control and starts the clamping operation, and then upon detecting the switching of the high-low relationship between the comparison voltage and the ramp voltage, the main control circuit returns the execution control to the PWM control and terminates the clamping operation.

According to another embodiment of the present disclosure, there is provided a configuration (fourth configuration) that in the switching power supply device of the first configuration, the clamp circuit sets the clamp voltage according to the output voltage.

According to another embodiment of the present disclosure, there is provided a configuration (fifth configuration) that in the switching power supply device of the fourth configuration, the ramp voltage generation circuit sets an amplitude of the ramp voltage according to the input voltage.

According to another embodiment of the present disclosure, there is provided a configuration (sixth configuration) that in the switching power supply device of the fifth configuration, the clamp voltage is proportional to the output voltage, and the amplitude of the ramp voltage is proportional to the input voltage.

According to another embodiment of the present disclosure, there is provided a configuration (seventh configuration) that in the switching power supply device of the first configuration, the clamp voltage is a predetermined fixed voltage.

According to another embodiment of the present disclosure, there is provided a configuration (eighth configuration) that in the switching power supply device of the first configuration, the comparison voltage generator includes an amplifier configured to input and output a current from and to the specific wiring based on a signal generated according to the feedback voltage or based on the feedback voltage.

According to another embodiment of the present disclosure, there is provided a configuration (ninth configuration) that in the switching power supply device of the first configuration, the output stage circuit includes the output transistor and a synchronous rectification transistor directly connected to the output transistor, the synchronous rectification transistor is installed between the application end of the output voltage and the reference conductive portion, and the main control circuit is configured to: in the PWM control, alternately turn on and off the output transistor and the synchronous rectification transistor based on the output signal of the PWM comparator; and in off-skip control, repeatedly execute a series of unit operations for turning on the output transistor and turning off the synchronous rectification transistor for a time exceeding one cycle of the PWM cycle, and then turning off the output transistor and turning on the synchronous rectification transistor for a time shorter than one cycle of the PWM cycle, or in the off-skip control, maintain the output transistor in an on-state and maintain the synchronous rectification transistor in an off-state.

According to another embodiment of the present disclosure, there is provided a configuration (tenth configuration) that in the switching power supply device of the first configuration, a coil is installed between the output transistor and the application end of the output voltage, and when the output transistor is turned on, a current based on the input voltage is allowed to flow toward the application end of the output voltage through the output transistor and the coil.

BRIEF DESCRIPTION OF DRAWINGS

The accompanying drawings, which are incorporated in and constitute a part of the specification, illustrate embodiments of the present disclosure.

DETAILED DESCRIPTION

Figure 1:
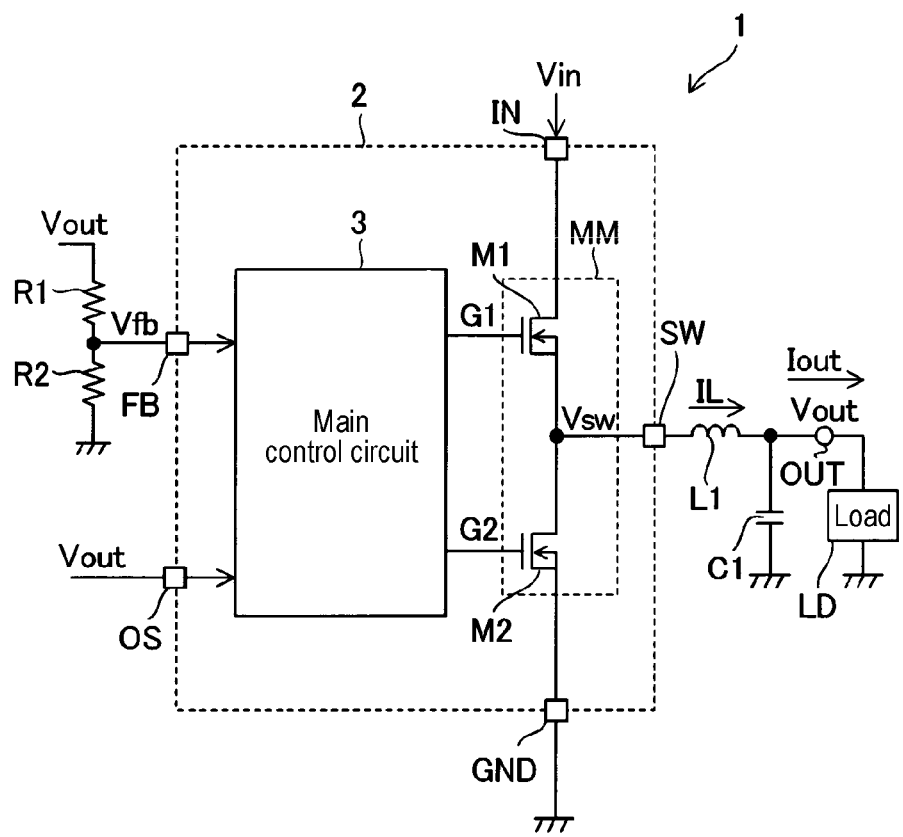
FIG. 1 is a schematic overall configuration diagram of a switching power supply device according to a first embodiment of the present disclosure.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Hereinafter, examples of embodiments of the present disclosure will be specifically described with reference to the drawings. In each of the referenced figures, the same parts are designated by like reference numerals, and redundant explanations regarding the same parts will be omitted in principle. In the subject specification, for the sake of simplification of description, symbols or codes that refer to information, signals, physical quantities, elements or parts may sometimes be used to thereby omit or abbreviate the names of the information, the signals, the physical quantities, the elements or the parts corresponding to the symbols or the codes. For example, the switching power supply IC referred to by reference numeral "2" described later (see FIG. 1) may be referred to as switching power supply IC 2, or may be abbreviated as a power supply IC 2 or simply IC 2. All of these expressions designate the same thing.

First, some terms used in the description of the embodiments of the present disclosure will be described. The term "IC" is an abbreviation of an integrated circuit. The term "ground" refers to a conductive portion having a reference potential of 0V (zero volt) or the potential of 0V itself. The potential of 0V may be referred to as a ground potential. In the embodiment of the present disclosure, a voltage indicated without any particular reference represents a potential seen from the ground. The term "level" refers to the level of a potential. For any signal or voltage, a high level has a higher potential than a low level. For any signal or voltage, a signal or voltage at a high level means that the level of the signal or voltage is high, and a signal or voltage at a low level means that the level of the signal or voltage is low. A level for a signal is sometimes referred to as signal level, and a level for a voltage is sometimes referred to as voltage level.

For any transistor configured as a FET (Field Effect Transistor) including a MOSFET, the term "on-state" means that the drain and source of the transistor are in a conduction state, and the term "off-state" means that the drain and source of the transistor are in a non-conduction state (interruption state). The same applies to transistors that are not classified into FETs. Unless otherwise specified, the MOSFET may be understood as an enhancement type MOSFET. The MOSFET is an abbreviation of "metal-oxide-semiconductor field-effect transistor."

Any switch can be configured by one or more FETs (Field Effect Transistors). When a switch is in an on-state, both ends of the switch are conductive. When a switch is in an off-state, both ends of the switch are non-conductive.

For any transistor or switch, switching from an off-state to an on-state is referred to as being turned on, and switching from an on-state to an off-state is referred to as being turned off. Hereinafter, the on-state and the off-state of any transistor or switch may be simply expressed as on and off, respectively.

First Embodiment

The first embodiment of the present disclosure will be described. FIG. 1 is an overall configuration diagram of a switching power supply device 1 according to a first embodiment of the present disclosure. The switching power supply device 1 of FIG. 1 includes a switching power supply IC 2 which is a switching power supply circuit (switching power supply semiconductor device), and a plurality of discrete components externally connected to the switching power supply IC 2. The discrete components include a capacitor C1 as an output capacitor, resistors R1 and R2 as feedback resistors, and a coil L1. The switching power supply device 1 is configured as a step-down switching power supply device (DC/DC converter) that generates a desired output voltage Vout from an input voltage Vin supplied from the outside. An output voltage Vout is generated at the output terminal OUT. That is, the output terminal OUT is an application end of the output voltage Vout (a terminal to which the output voltage Vout is applied). The output voltage Vout is supplied to a load LD connected to the output terminal OUT. The input voltage Vin and the output voltage Vout are positive DC voltages, and the output voltage Vout is lower than the input voltage Vin. For example, when the input voltage Vin is 12V, the output voltage Vout can be stabilized at a desired positive voltage value (e.g., 3.3V or 5V) of less than 12V by adjusting the resistance values of the resistors R1 and R2. The current flowing to the load LD via the output terminal OUT is referred to as an output current Iout.

Figure 2:
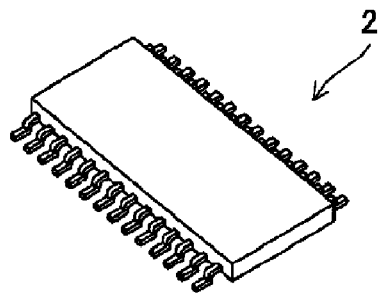
FIG. 2 is an external perspective view of a switching power supply IC according to the first embodiment of the present disclosure.

The switching power supply IC 2 is an electronic component formed by enclosing a semiconductor integrated circuit shown in FIG. 2 in a housing (package) made of a resin. A plurality of external terminals is provided in the housing of the IC 2 in an exposed state. The plurality of external terminals include an input terminal IN, a switch terminal SW, a feedback terminal FB, an output monitoring terminal OS, and a ground terminal GND shown in FIG. 1. Terminals other than these terminals may also be included in the plurality of external terminals. The number of external terminals of the IC 2 and the appearance of the IC 2 shown in FIG. 2 are merely examples.

An external configuration of the switching power supply IC 2 will be described. The input voltage Vin is supplied to the input terminal IN from the outside of the IC 2. A coil L1 is interposed in series between the switch terminal SW and the output terminal OUT. That is, one end of the coil L1 is connected to the switch terminal SW, and the other end of the coil L1 is connected to the output terminal OUT. Further, the output terminal OUT is connected to the ground via the capacitor C1. Moreover, the output terminal OUT is connected to one end of the resistor R1, and the other end of the resistor R1 is connected to the ground via the resistor R2. The connection node between the resistors R1 and R2 is connected to the feedback terminal FB. In addition, an output voltage Vout is applied to the output monitoring terminal OS, and the ground terminal GND is connected to the ground. A current flowing through the coil L1 is referred to as a coil current IL.

An internal configuration of the switching power supply IC 2 will be described. The switching power supply IC 2 includes an output stage circuit MM and a main control circuit 3 for controlling the output stage circuit MM.

The output stage circuit MM includes transistors M1 and M2 configured as N-channel type MOSFETs (Metal Oxide Semiconductor Field Effect Transistors). The transistors M1 and M2 are a pair of switching elements connected in series between the input terminal IN and the ground terminal GND (in other words, the ground). The input voltage Vin is switched by switching and driving the transistors M1 and M2. A rectangular wave-shaped switch voltage Vsw appears at the switch terminal SW. The transistor M1 is provided on the high side, and the transistor M2 is provided on the low side. Specifically, the drain of the transistor M1 is connected to the input terminal IN which is an application end for the input voltage Vin, and the source of the transistor M1 and the drain of the transistor M2 are commonly connected to the switch terminal SW. The source of transistor M2 is connected to the ground. A resistor for current detection may be inserted between the source of the transistor M2 and the ground.

The transistor M1 functions as an output transistor, and the transistor M2 functions as a synchronous rectification transistor. The coil L1 and the capacitor C1 form a rectifying smoothing circuit that rectifies and smoothes the rectangular wave-shaped switch voltage $V_{SW}$ appearing at the switch terminal SW to generate an output voltage Vout. The resistors R1 and R2 form a voltage dividing circuit that divides the output voltage Vout. A feedback voltage Vfb, which is a divided voltage of the output voltage Vout, is generated at the connection node between the resistors R1 and R2. The feedback voltage Vfb is inputted to the feedback terminal FB by connecting the connection node between the resistors R1 and R2 to the feedback terminal FB.

Gate signals G1 and G2 as drive signals are supplied to the gates of the transistors M1 and M2, respectively, and the transistors M1 and M2 are turned on and off in response to the gate signals G1 and G2. When the gate signal G1 is at a high level, the transistor M1 is turned on, and when the gate signal G1 is at a low level, the transistor M1 is turned off. Similarly, when the gate signal G2 is at a high level, the transistor M2 is turned on, and when the gate signal G2 is at a low level, the transistor M2 is turned off. Basically, the transistors M1 and M2 are turned on and off alternately. However, the transistors M1 and M2 may be simultaneously maintained in an off-state. That is, the state of the output stage circuit MM is either an output high state, an output low state, or a Hi-Z state. In the output high state, the transistors M1 and M2 are in an on-state and an off-state, respectively. In the low output state, the transistors M1 and M2 are in an off-state and an on-state, respectively. In the Hi-Z state, both the transistors M1 and M2 are in an off-state. The transistors M1 and M2 do not simultaneously enter into an on-state.

The main control circuit 3 controls the on/off-states of the transistors M1 and M2 through the level control of the gate signals G1 and G2 based on the feedback voltage Vfb, whereby the output voltage Vout according to the feedback voltage Vfb is generated at the output terminal OUT. Further, as shown in FIG. 1, the output voltage Vout may be applied to the main control circuit 3. The main control circuit 3 can perform overvoltage protection or the like based on the output voltage Vout, and can also set the below-described clamp voltage by using the output voltage Vout (details will be described later).

Although it is assumed here that the synchronous rectification method is used, a diode rectification method may be adopted in the output stage circuit MM. When the diode rectification method is adopted, the transistor M2 is removed from the output stage circuit MM, and instead, a synchronous rectification diode (not shown), in which the anode is connected to the ground and the cathode is connected to the switch terminal SW, is provided in the output stage circuit MM (as a result, the switching operation of the output stage circuit MM becomes the switching operation of only the transistor M1).

Figure 3:
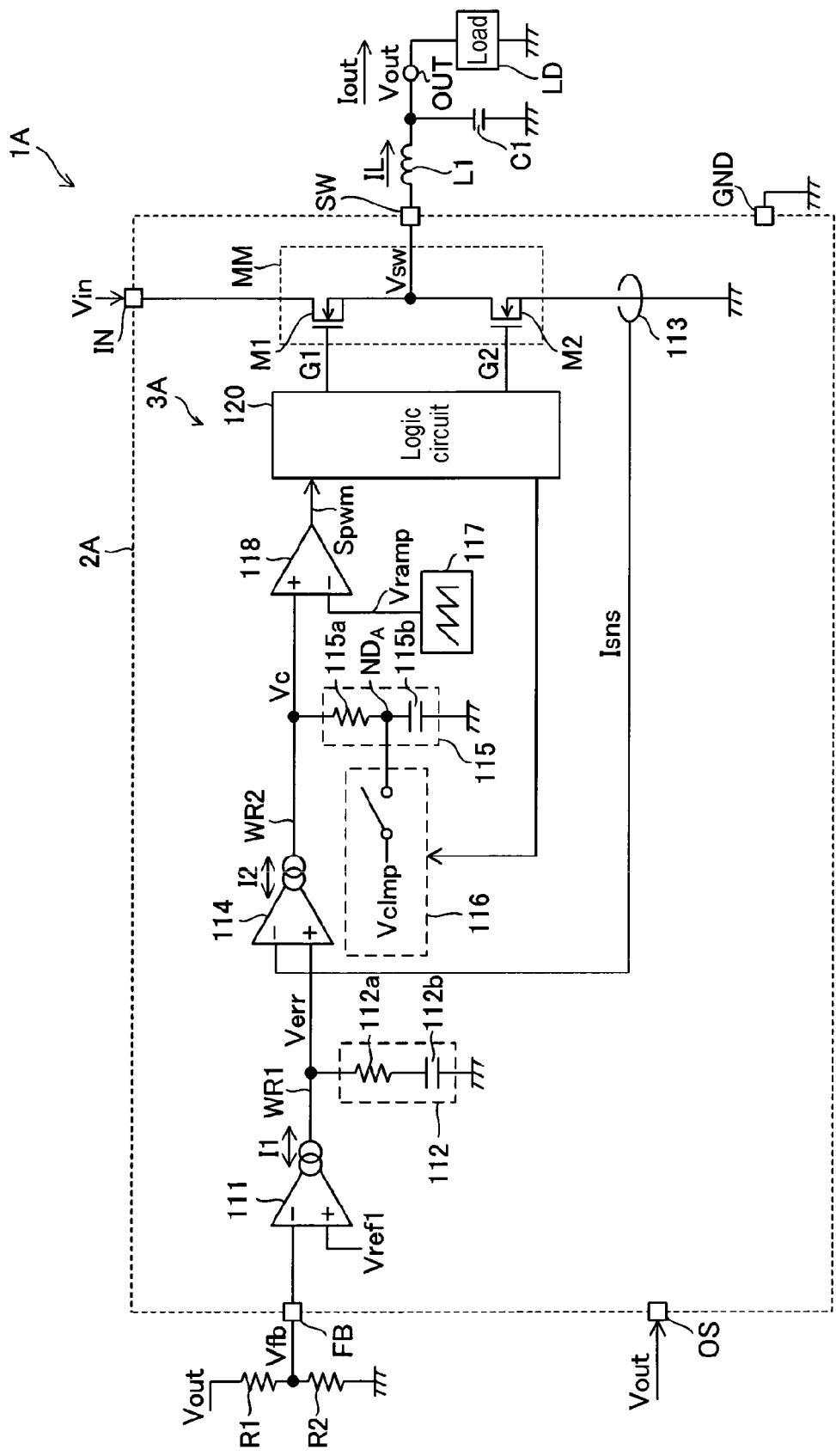
FIG. 3 is a configuration diagram of a switching power supply device according to the first embodiment of the present disclosure.

In the first embodiment, the configuration and operation of the switching power supply device 1 will be described below by taking, as an example, a switching power supply device 1A in which a current mode control method is adopted. FIG. 3 is an overall configuration diagram of a switching power supply device 1A, which is a switching power supply device 1 in which a current mode control method is adopted. The switching power supply device 1A includes a switching power supply IC 2A as the switching power supply IC 2. The switching power supply IC 2A includes an output stage circuit MM and a main control circuit 3A as the main control circuit 3. The above descriptions regarding the switching power supply device 1, the switching power supply IC 2 and the main control circuit 3 are all applied to the switching power supply device 1A, the switching power supply IC 2A and the main control circuit 3A to the extent there is no contradiction.

The main control circuit 3A includes an error amplifier 111, a phase compensation circuit 112, a current sensor 113, a differential amplifier 114, a phase compensation circuit 115, a clamp circuit 116, a ramp voltage generation circuit 117, a comparator (PWM comparator) 118 and a logic circuit 120.

The error amplifier 111 is a current output type transconductance amplifier. The voltage applied to the feedback terminal FB (i.e., the feedback voltage Vfb) is supplied to the inverting input terminal of the error amplifier 111, and a predetermined reference voltage Vref1 is supplied to the non-inverting input terminal of the error amplifier 111. The reference voltage Vref1 is a DC voltage having a predetermined positive voltage value, and is generated by a reference voltage generation circuit (not shown) in the IC 2A. The error amplifier 111 outputs an error current signal I1 corresponding to the difference between the feedback voltage Vfb and the reference voltage Vref1 from its own output terminal. The electric charge due to the error current signal I1 is inputted to and outputted from a wiring WR1 which is an error signal wiring. Specifically, when the feedback voltage Vfb is lower than the reference voltage Vref1, the error amplifier 111 outputs a current due to the error current signal I1 from the error amplifier 111 toward the wiring WR1 so that the potential of the wiring WR1 rises. When the feedback voltage Vfb is higher than the reference voltage Vref1, the error amplifier 111 inputs a current due to the error current signal I1 from the wiring WR1 toward the error amplifier 111 so that the potential of the wiring WR1 drops. As the absolute value of the difference between the feedback voltage Vfb and the reference voltage Vref1 increases, the magnitude of the current due to the error current signal I1 also increases.

The phase compensation circuit 112 is provided between the wiring WR1 and the ground. The phase compensation circuit 112 receives the input of the error current signal I1 to generate an error voltage Verr on the wiring WR1. The phase compensation circuit 112 is provided to compensate the phase of the error voltage Verr. The phase compensation circuit 112 includes a series circuit composed of a resistor 112a and a capacitor 112b. Specifically, one end of the resistor 112a is connected to the wiring WR1, and the other end of the resistor 112a is connected to the ground via the capacitor 112b. By appropriately setting the resistance value of the resistor 112a and the capacitance value of the capacitor 112b, the phase of the error voltage Verr can be compensated to prevent oscillation of an output feedback loop.

The current sensor 113 samples the coil current IL flowing through the coil L1 at a predetermined timing, and outputs a current detection signal Isns indicating a value of the sampled coil current IL. Since the current detection signal Isns is a voltage signal, the voltage represented by the current detection signal Isns may be referred to as voltage Isns. It is assumed that the polarity of the coil current IL flowing in the direction from the switch terminal SW to the output terminal OUT is positive, and the polarity of the coil current IL flowing in the direction from the output terminal OUT to the switch terminal SW is negative. The voltage Isns increases as the coil current IL flows from the negative side to the positive side. Therefore, when the coil current IL is positive, the voltage Isns increases as the magnitude of the coil current IL increases. When the coil current IL is negative, the voltage Isns decreases as the magnitude of the coil current IL increases. For example, the current sensor 113 includes a sense resistor provided between the source and ground of the transistor M2, and generates a voltage Isns by sampling the voltage drop of the sense resistor during the period in which the transistor M2 is turned on. That is, although the coil current IL can be detected by detecting the current flowing through the transistor M2, the current sensor 113 may generate a voltage Isns by detecting the current flowing through the transistor M1 or by directly detecting the current flowing through the coil L1.

Similarly to the error amplifier 111, the differential amplifier 114 is also a current output type trans-conductance amplifier. The error voltage Verr applied to the wiring WR1 is supplied to the non-inverting input terminal of the differential amplifier 114, and the voltage Isns is supplied to the inverting input terminal of the differential amplifier 114. The differential amplifier 114 outputs a current signal I2 corresponding to the difference between the error voltage Verr and the voltage Isns from its own output terminal. The electric charge due to the current signal I2 is inputted to and outputted from a wiring WR2. Specifically, when the error voltage Verr is higher than the voltage Isns, the differential amplifier 114 outputs a current due to the current signal I2 from the differential amplifier 114 toward the wiring WR2 so that the potential of the wiring WR2 rises. When the error voltage Verr is lower than the voltage Isns, the differential amplifier 114 inputs a current due to the current signal I2 from the wiring WR2 toward the differential amplifier 114 so that the potential of the wiring WR2 drops. As the absolute value of the difference between the error voltage Verr and the voltage Isns increases, the magnitude of the current due to the current signal I2 also increases.

The phase compensation circuit 115 is provided between the wiring WR2 and the ground. The phase compensation circuit 115 receives the input of the current signal I2 to generate a comparison voltage Vc on the wiring WR2. The phase compensation circuit 115 is provided to compensate the phase of the comparison voltage Vc. The phase compensation circuit 115 includes a series circuit composed of a resistor 115a and a capacitor 115b. Specifically, one end of the resistor 115a is connected to the wiring WR2, and the other end of the resistor 115a is connected to the ground via the capacitor 115b. By appropriately setting the resistance value of the resistor 115a and the capacitance value of the capacitor 115b, the phase of the comparison voltage Vc can be compensated to prevent oscillation of an output feedback loop. The resistor 115a and the capacitor 115b function as a phase compensation resistor and a phase compensation capacitor, respectively, for compensating the phase of the comparison voltage Vc. A connection node between the resistor 115a and the capacitor 115b is referred to as a node $ND_A$.

The clamp circuit 116 is connected to the node $ND_A$ to clamp the voltage of the node NDA with a clamp voltage Vclmp set by itself at a required timing. Details of the configuration and operation of the clamp circuit 116 will be described later.

Figure 4:
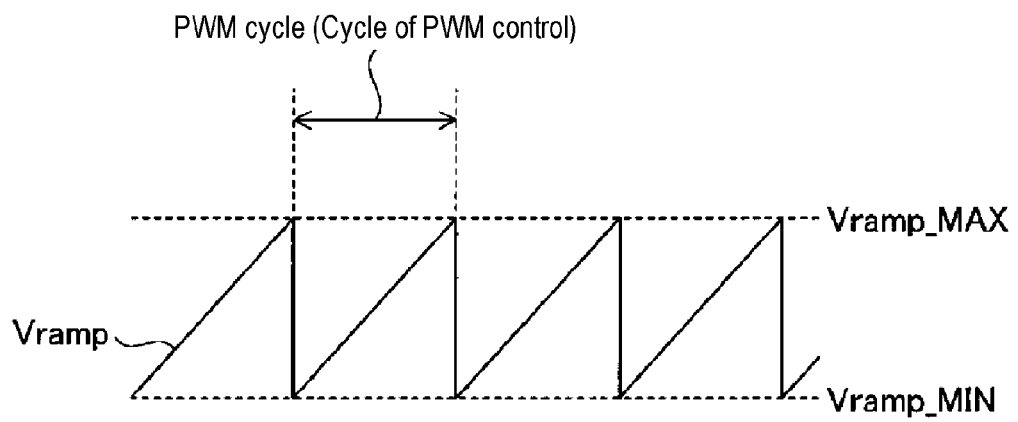
FIG. 4 is a waveform diagram of a ramp voltage according to the first embodiment of the present disclosure.

The ramp voltage generation circuit 117 generates a ramp voltage Vramp whose voltage value is changed periodically in a predetermined PWM cycle. The PWM cycle corresponds to the reciprocal of the PWM frequency described later. The ramp voltage Vramp has, for example, a triangular or saw tooth voltage waveform. In this regard, as shown in FIG. 4, the ramp voltage Vramp is assumed to fluctuate between a predetermined positive lower limit voltage value Vramp MIN and a predetermined positive upper limit voltage value Vramp_MAX. That is, the range from the lower limit voltage value Vramp MIN to the upper limit voltage value Vramp_MAX is a fluctuation range (variable range) of the ramp voltage Vramp, and is "Vramp_MAX>Vramp_MIN." The cycle of fluctuation of the ramp voltage Vramp is the PWM cycle (in other words, the cycle of PWM control). In each PWM cycle, the ramp voltage Vramp linearly and monotonically increases with the lapse of time starting from the lower limit voltage value Vramp_MIN. When the upper limit voltage value Vramp_MAX is reached, the ramp voltage Vramp is instantly returned to the lower limit voltage value Vramp_MIN.

The comparison voltage Vc on the WR2 is supplied to the non-inverting input terminal of the comparator 118, and the ramp voltage Vramp from the ramp voltage generation circuit 117 is supplied to the inverting input terminal of the comparator 118. The comparator 118 compares the comparison voltage Vc with the ramp voltage Vramp and outputs a pulse width modulation signal Spwm indicating a comparison result. The pulse width modulation signal Spwm becomes a high level during a period in which the comparison voltage Vc is higher than the ramp voltage Vramp, and becomes a low level during a period in which the comparison voltage Vc is lower than the ramp voltage Vramp.

The logic circuit 120 causes the output stage circuit MM to perform a switching operation by supplying the gate signals G1 and G2 based on the pulse width modulation signal Spwm from the comparator 118 to the transistors M1 and M2. In the switching operation, the transistors M1 and M2 are alternately turned on and off based on the signal Spwm. Since the error amplifier 111 generates the current signal I1 so that the feedback voltage Vfb and the reference voltage Vref1 are equal to each other, the output voltage Vout is stabilized at a predetermined target voltage Vtg corresponding to the reference voltage Vref1 and the voltage division ratio by the resistors R1 and R2 through the execution of the switching operation.

Figure 5:
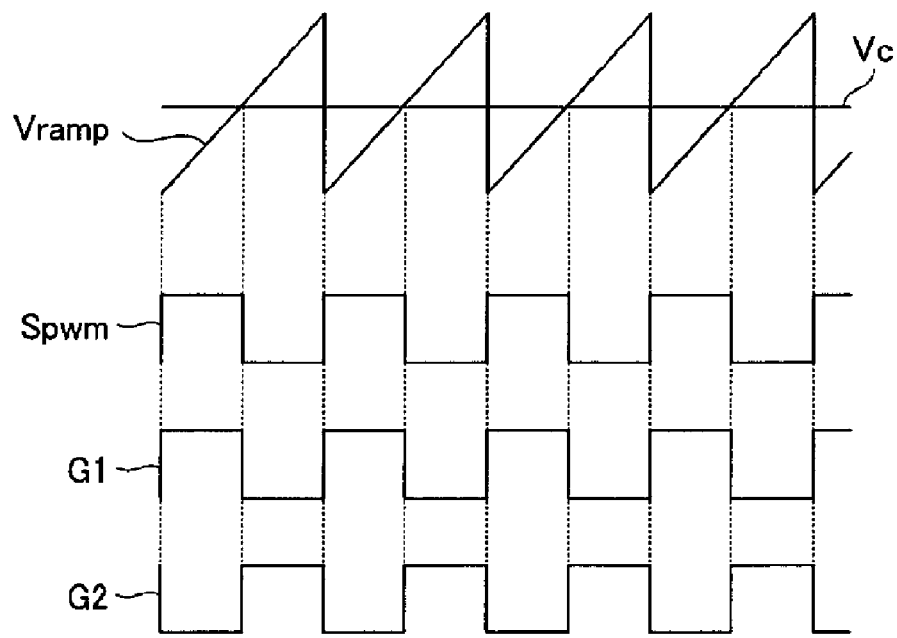
FIG. 5 is a waveform diagram in PWM control according to the first embodiment of the present disclosure.

Basically, the comparison voltage Vc falls within the fluctuation range of the ramp voltage Vramp. When the comparison voltage Vc is maintained within the fluctuation range of the ramp voltage Vramp, as shown in FIG. 5, a period in which the signal Spwm becomes a high level and a period in which the signal Spwm becomes a low level are generated in each PWM cycle. PWM control is performed at a PWM frequency. In the PWM control, the output stage circuits MM (transistors M1 and M2) are switched at the PWM frequency based on the switching of the high-low relationship between the comparison voltage Vc and the ramp voltage Vramp. That is, in the PWM control, the transistors M1 and M2 are alternately turned on and off in the PWM cycle based on the signal Spwm.

More specifically, in the PWM control (in the switching operation by the PWM control), during the period in which the signal Spwm is a high level, the gate signal G1 of a high level and the gate signal G2 of a low level are supplied to the gates of the transistors M1 and M2, respectively, whereby the transistors M1 and M2 are turned on and off, respectively (that is, the output stage circuit MM enters into an output high state). In the output high state, a current based on the input voltage Vin flows through the transistor M1 and the coil L1 toward the application end (OUT) of the output voltage Vout. In contrast, in the PWM control (in the switching operation by the PWM control), during the period in which the signal Spwm is a low level, the gate signal G1 of a low level and the gate signal G2 of a high level are supplied to the gates of the transistors M1 and M2, respectively, whereby the transistors M1 and M2 are turned off and turned on, respectively (that is, the output stage circuit MM enters into an output low state). In the output low state, a current based on the stored energy of the coil L1 flows through the transistor M2 and the coil L1. In order to reliably prevent generation of a through current, a dead time during which the transistors M1 and M2 are turned off may be interposed between the period during which the transistor M1 is turned on and the period during which the transistor M2 is turned on.

The value of the input voltage Vin and the value of the target voltage Vtg with respect to the output voltage Vout are arbitrary. For example, the target voltage Vtg is 3.3V or 5V, and the input voltage Vin is basically 12V or 24V. The input voltage Vin is higher than the target voltage Vtg for most of the period. However, the input voltage Vin may temporarily fall below the target voltage Vtg (details will be described later).

As described above, the switching power supply device 1A adopts the current mode control method that performs output feedback control based on both the output voltage Vout and the coil current IL. The voltage Isns corresponding to the coil current IL is inputted back to the differential amplifier 114. Due to the action of the differential amplifier 114, the coil current IL increases when the error voltage Verr rises, and the coil current IL decreases when the error voltage Verr decreases.

Although not shown here, a limiting circuit (not shown) which is connected to the wiring WR1 to limit the fluctuation range of the error voltage Verr on the wiring WR1 within a predetermined range may also be provided in the main control circuit 3A. The limiting circuit (not shown) functions to set upper and lower limits on the coil current IL by setting upper and lower limits on the error voltage Verr (the limiting circuit functions to limit the variable range of the coil current IL by setting a limit on the variable range of the error voltage Verr).

In the switching power supply device 1 (power supply device 1A in the present embodiment), the input voltage Vin may fluctuate, and the input voltage Vin may temporarily fall below the target voltage Vtg of the output voltage Vout. A clamp circuit may be introduced so that the comparison voltage Vc does not rise excessively when the input voltage Vin drops to a level below the target voltage Vtg.

Reference Switching Power Supply Device

Figure 6:
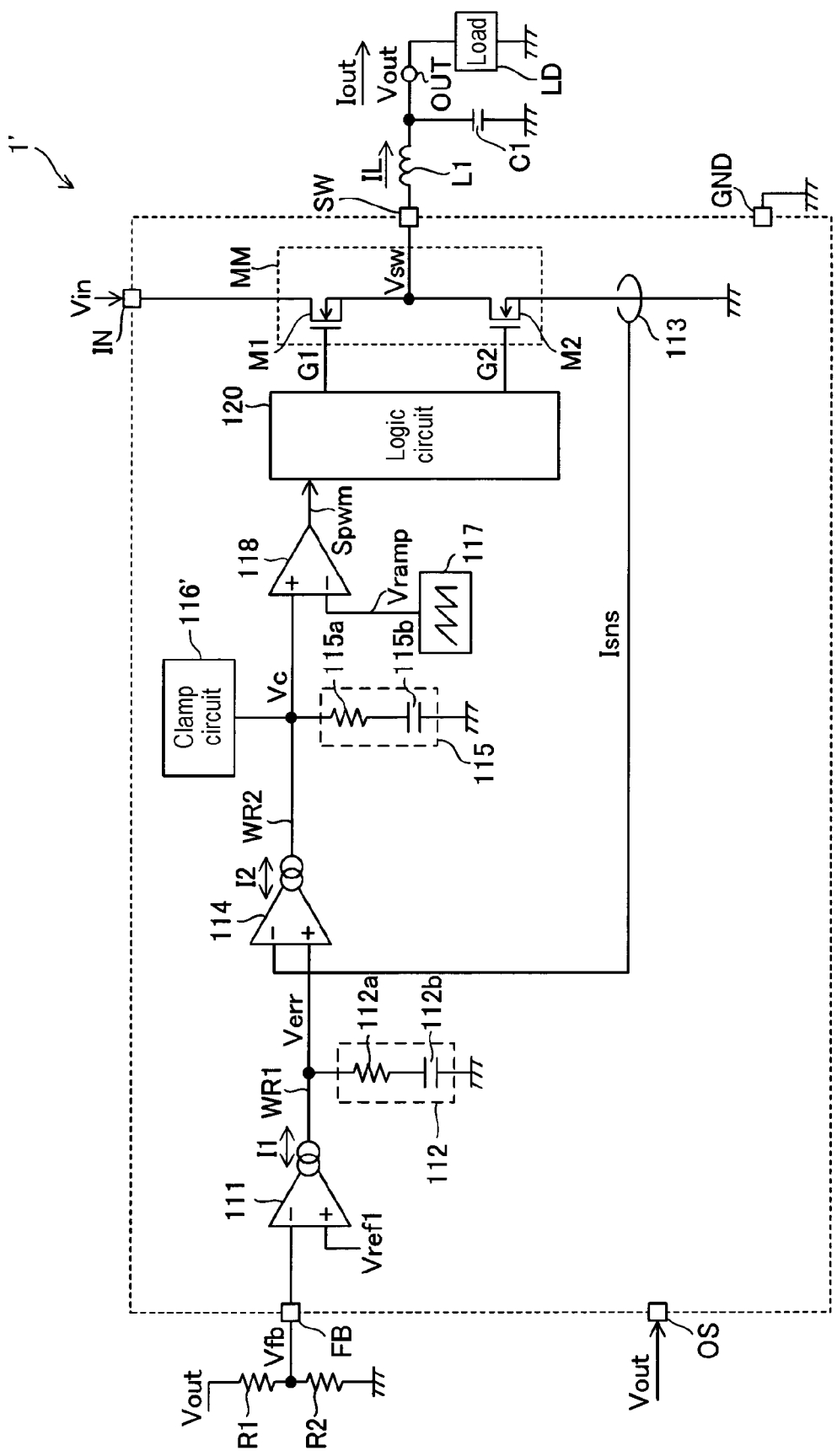
FIG. 6 is a configuration diagram of a reference switching power supply device provided for comparison with the switching power supply device of FIG. 3.
Figure 7:
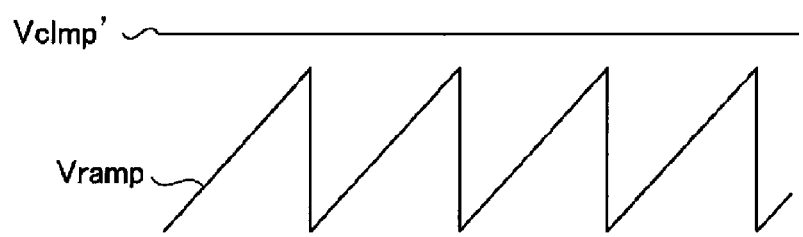
FIG. 7 is a diagram showing a relationship between a ramp voltage and a clamp voltage in the reference switching power supply device of FIG. 6.

FIG. 6 shows a reference switching power supply device 1' used for comparison with the switching power supply device 1A of FIG. 3. In the reference switching power supply device 1', a clamp circuit 116' is provided as the clamp circuit. The clamp circuit 116' is connected to the wiring WR2 to clamp the comparison voltage Vc so that the comparison voltage Vc does not rise beyond a predetermined clamp voltage Vclmp'. In this regard, as shown in FIG. 7, the clamp voltage Vclmp' needs to be set to a voltage higher than the maximum voltage (Vramp_MAX) of the ramp voltage Vramp so as not to affect the PWM control that should be executed in the normal operation. Then, in the reference switching power supply device 1', a relatively large overshoot may occur in the output voltage Vout when the input voltage Vin is restored after going through the decrease in the input voltage Vin.

Figure 8:
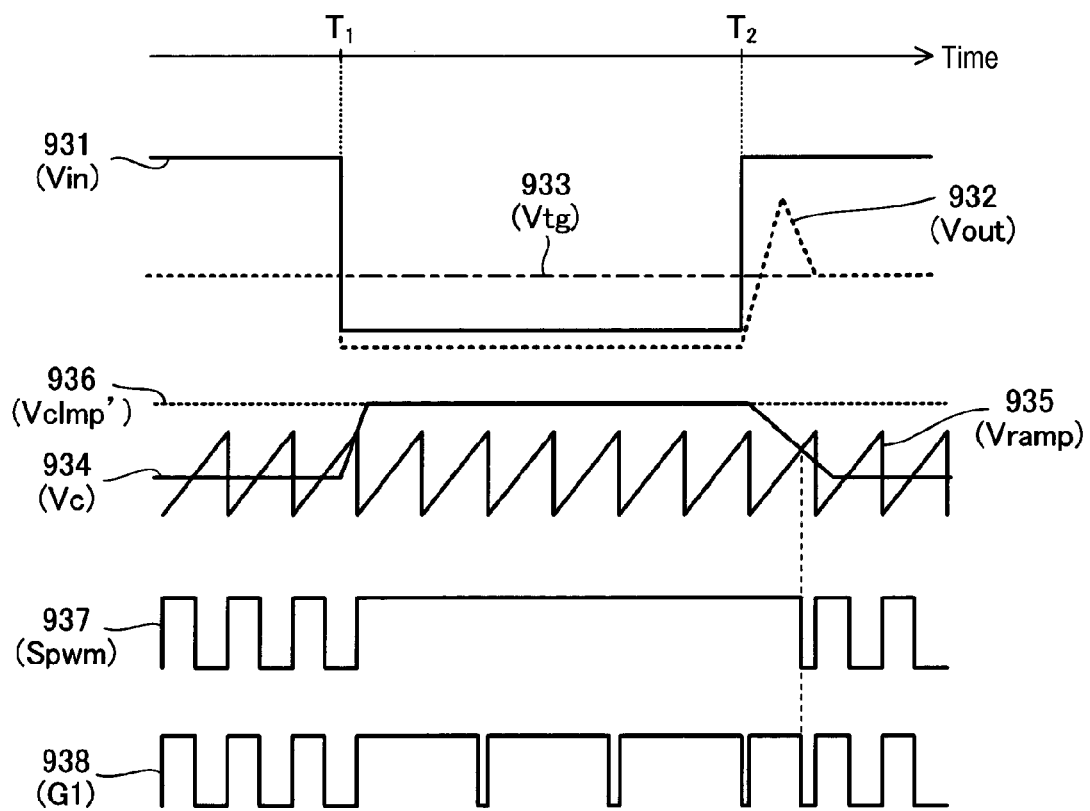
FIG. 8 is a timing chart of the reference switching power supply device of FIG. 6.

This will be described with reference to FIG. 8. In FIG. 8, a solid line 931, a broken line 932, a one-dot chain line 933, a solid line 934, a solid line 935, a broken line 936, a solid line 937 and a solid line 938 indicate schematic waveforms of the input voltage Vin, the output voltage Vout, the target voltage Vtg, the comparison voltage Vc, the ramp voltage Vramp, the clamp voltage Vclmp', the signal Spwm and the gate signal G1, respectively, in the reference switching power supply device 1'.

In the reference switching power supply device 1', the input voltage Vin is higher than the target voltage Vtg before timing $T_1$, and the output voltage Vout is stabilized at the target voltage Vtg through the execution of PWM control. At timing $T_1$, the input voltage Vin sharply drops to a voltage below the target voltage Vtg. Along with this, the output voltage Vout also becomes lower than the target voltage Vtg. As a result, the comparison voltage Vc rises toward the clamp voltage Vclmp'. After the comparison voltage Vc rises to the clamp voltage Vclmp', the comparison voltage Vc is maintained at the clamp voltage Vclmp' as long as "Vout<Vtg." In the example of FIG. 8, during the period in which the comparison voltage Vc exceeds the maximum voltage of the ramp voltage Vramp, an operation is repeated in which after the output stage circuit MM is put into an output high state for a minute time shorter than twice the PWM cycle, the output stage circuit MM is put into an output low state for a minute time.

In the reference switching power supply device 1', the input voltage Vin returns from a state lower than the target voltage Vtg to a state higher than the target voltage Vtg at timing $T_2$ after timing $T_1$. Along with this return, the output voltage Vout starts to rise toward the target voltage Vtg, and the comparison voltage Vc decreases as the output voltage Vout rises. However, in the reference switching power supply device 1', the capacitor 115b is charged with the clamp voltage Vclmp' immediately before timing $T_2$. Therefore, it takes a relatively long time for the comparison voltage Vc to drop to an appropriate voltage. As a result, a large overshoot (a phenomenon in which the output voltage Vout rises to above the target voltage Vtg) may occur in the output voltage Vout.

In the reference switching power supply device 1' and the switching power supply device 1A, the error between the output voltage Vout and the target voltage Vtg is integrated over a relatively long time through the use of the capacitor 115b, and the on-duty in PWM control is adjusted relatively gently. As a result, the output voltage Vout can be stabilized with high accuracy. However, in the reference switching power supply device 1', the above error is integrated in the capacitor 115b during the period in which the output voltage Vout is lower than the target voltage Vtg along with the decrease in the input voltage Vin. Then, in the reference switching power supply device 1', immediately after the input voltage Vin is restored, the integrated content (information that the output voltage Vout is lower than the target voltage Vtg) acts in such a direction as to excessively push up the output voltage Vout, thereby generating an overshoot.

Study on Connection Position of Clamp Circuit

In order to suppress such an overshoot, in the switching power supply device 1A of FIG. 3, the clamp circuit 116 is connected to the node NDA, which is the connection node between the resistor 115a and the capacitor 115b, instead of the wiring WR2. In the situation where the comparison voltage Vc exceeds the maximum voltage of the ramp voltage Vramp along with the decrease in the input voltage Vin, the voltage of the node $ND_A$ is clamped with the clamp voltage Vclmp. The operation of clamping the voltage of the node $ND_A$ with the clamp voltage Vclmp is called a clamping operation. The clamping operation may be an operation of keeping the voltage of the node $ND_A$ at the clamp voltage Vclmp. Alternatively, the clamping operation may be an operation that prevents (prohibits) the voltage at the node $ND_A$ from being higher than the clamp voltage Vclmp while allowing the voltage at the node $ND_A$ to be lower than the clamp voltage Vclmp.

The execution or non-execution of the clamp operation is controlled by the clamp control part (see FIG. 3) included in the logic circuit 120. In order not to affect the PWM control that should be executed in the normal operation, the logic circuit 120 (clamp control part) stops the clamping operation in a state in which the comparison voltage Vc falls within the fluctuation range of the ramp voltage Vramp (i.e., a state in which the PWM control is executed), and executes the clamping operation in a state in which the comparison voltage Vc exceeds the fluctuation range of the ramp voltage Vramp (i.e., a state in which "Vc>Vramp_MAX"). When the clamp operation is stopped, the impedance of the clamp circuit 116 as seen from the node $ND_A$ becomes sufficiently high, and the current flow between the node $ND_A$ and the clamp circuit 116 disappears (which is equivalent to the configuration in which the clamp circuit 116 does not exist).

On the other hand, the logic circuit 120 performs off-skip control instead of PWM control in a state in which the comparison voltage Vc exceeds the fluctuation range of the ramp voltage Vramp (i.e., a state in which "Vc>Vramp_MAX").

Figure 9A:
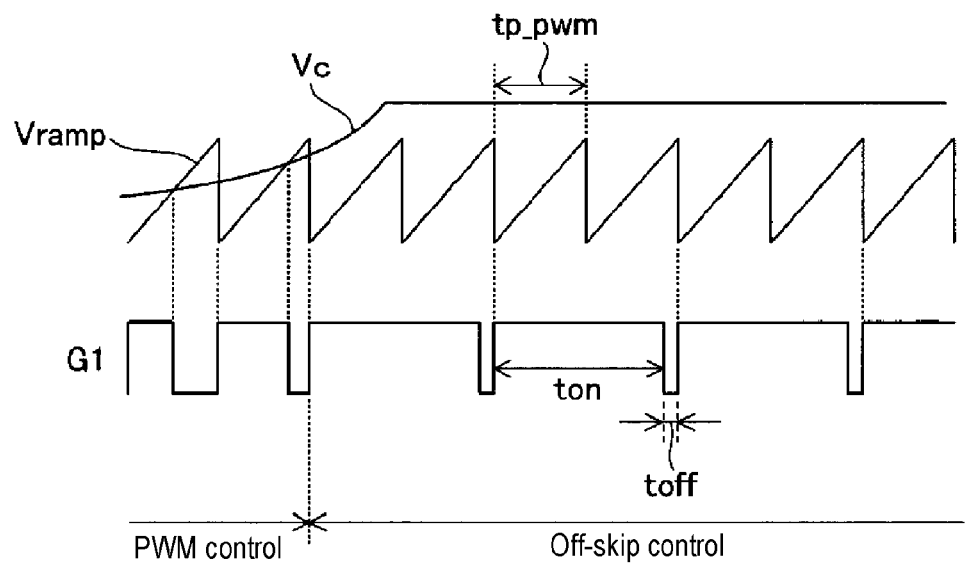
FIGS. 9A and 9B are explanatory diagrams of PWM control and off-skip control realized by the switching power supply device of FIG. 3.

Off-skip control will be described with reference to FIG. 9A and the like. In the PWM control, the transistor M1 is turned off at each PWM cycle, and the transistor M2 is turned on in synchronization with the turn-off of the transistor M1. On the other hand, in the off-skip control, the turn-off of the transistor M1 is skipped for each PWM cycle. In the off-skip control according to a first example, as shown in FIG. 9A, a series of unit operations is repeatedly executed in which the output stage circuit MM is kept in an output high state for a time ton and then the output stage circuit MM is kept in an output low state for a time toff. In this regard, the time ton is longer than the time for one cycle of the PWM cycle, and the time toff is shorter than the time for one cycle of the PWM cycle.

The time length for one cycle of the PWM cycle is represented by a symbol "tp_pwm." Then, "ton=tp_pwm× n−Δt" and "toff=Δt" where n is an integer of 2 or more, and the time Δt is a predetermined time (e.g., Δt=tp_pwm×0.02) sufficiently shorter than the time tp_pwm. In the example of FIG. 9A, "n=2." In some drawings described later, it is assumed that "n=2," but n is arbitrary as long as it is an integer of 2 or more. For example, "n=4" or "n=8."

Figure 9B:
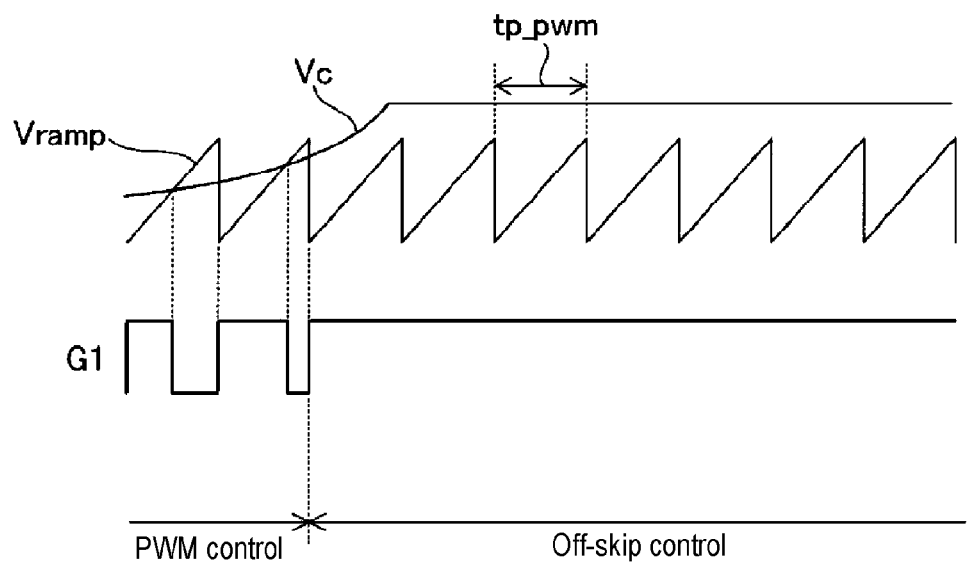

In the off-skip control according to a second example, as shown in FIG. 9B, the output stage circuit MM is always maintained in an output high state.

In any case, in the off-skip control, the transistor M1 is maintained in an on-state (i.e., an output high state) for more than one cycle of the PWM cycle. By such off-skip control, it is possible to suppress the decrease in the output voltage Vout due to the decrease in the input voltage Vin as much as possible. In the following description, it is assumed that the off-skip control according to the first example is used as the off-skip control. However, the off-skip control according to the second example may be used.

The logic circuit 120 executes PWM control in a state in which the comparison voltage Vc is maintained within the fluctuation range of the ramp voltage Vramp. On the other hand, in a state in which the comparison voltage Vc exceeds the maximum voltage (Vramp_MAX) of the ramp voltage Vramp and thus the switching of the high-low relationship between the comparison voltage Vc and the ramp voltage Vramp does not occur for the time tp_pwm or more of one cycle of the PWM cycle, the logic circuit 120 executes off-skip control. Then, the logic circuit 120 (clamp control part) stops the clamping operation of the clamp circuit 116 during the period in which the PWM control is executed, and executes the clamping operation in conjunction with the execution of the off-skip control (during the period in which the off-skip control is executed).

Figure 10:
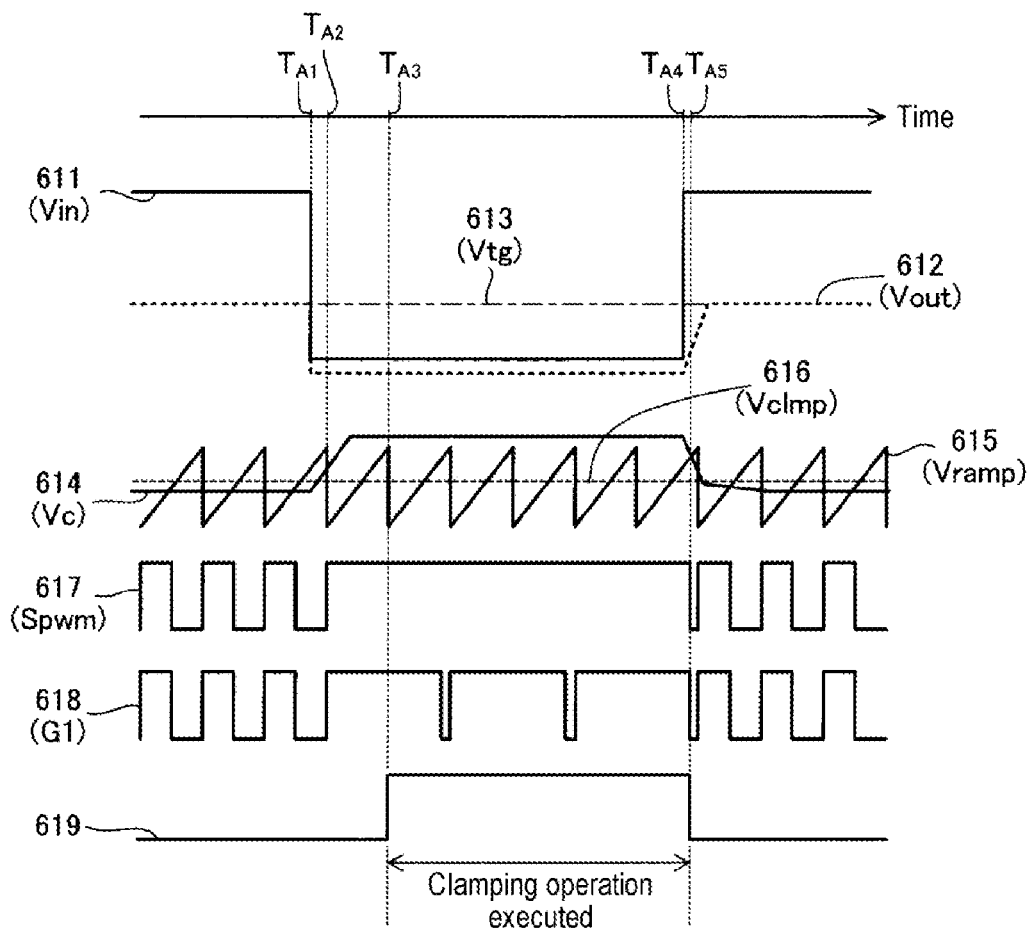
FIG. 10 is a timing chart of the switching power supply device of FIG. 3.

The operation of the switching power supply device 1A performed in response to the fluctuation of the input voltage Vin will be described with reference to FIG. 10. In FIG. 10, a solid line 611, a broken line 612, a one-dot chain line 613, a solid line 614, a solid line 615, a broken line 616, a solid line 617 and a solid line 618 indicate schematic waveforms of the input voltage Vin, the output voltage Vout, the target voltage Vtg, the comparison voltage Vc, the ramp voltage Vramp, the clamp voltage Vclmp, the signal Spwm and the gate signal G1, respectively, in the switching power supply device 1A. The solid line 619 indicates the operating state of the clamp circuit 116. The clamp voltage Vclmp is set to a voltage within the fluctuation range of the ramp voltage Vramp. As will be described later, the clamp voltage Vclmp may be set to a voltage corresponding to the output voltage Vout. However, in FIG. 10, it is assumed that the clamp voltage Vclmp is fixed at a constant voltage.

In the switching power supply device 1A, before timing $T_{A1}$, the input voltage Vin is higher than the target voltage Vtg, and the output voltage Vout is stabilized at the target voltage Vtg through the execution of PWM control. At timing $T_{A1}$, the input voltage Vin sharply drops to a voltage below the target voltage Vtg. Along with this, the output voltage Vout also becomes lower than the target voltage Vtg, and as a result, the comparison voltage Vc rises. Since the upper limit of the increase in the comparison voltage Vc is limited to the power supply voltage on the positive side of the amplifier 114, and the power supply voltage on the positive side of the amplifier 114 is higher than the maximum voltage (Vramp_MAX) of the ramp voltage Vramp, the comparison voltage Vc may rise to above the maximum voltage of the ramp voltage Vramp.

In the example of FIG. 10, the comparison voltage Vc is in the process of rising at timing $T_{A2}$ after timing $T_{A1}$. At the timing $T_{A2}$, the ramp voltage Vramp is changed from the maximum voltage (Vramp_MAX) of the ramp voltage Vramp to the minimum voltage (Vramp_MIN), whereby the state of "Vramp>Vc" is switched to the state of "Vramp<Vc." At timing $T_{A3}$ where one cycle of the PWM cycle has elapsed from timing $T_{A2}$, the ramp voltage Vramp is changed again from the maximum voltage (Vramp_MAX) of the ramp voltage Vramp to the minimum voltage (Vramp_MIN) thereof. However, from the timing after timing $T_{A2}$ and before timing $T_{A3}$, the comparison voltage Vc continuously exceeds the maximum voltage (Vramp_MAX) of the ramp voltage Vramp. Therefore, the signal Spwm is continuously maintained at a high level between timings $T_{A2}$ and $T_{A3}$.

Based on the signal Spwm, the logic circuit 120 can detect at the stage of timing $T_{A3}$ that the switching of the high-low relationship between the comparison voltage Vc and the ramp voltage Vramp does not occur for one cycle (tp_pwm) of the PWM cycle. Therefore, off-skip control is executed after timing $T_{A3}$. However, if the detection is performed at the stage of timing $T_{A3}$, the control for keeping the transistor M1 in an on-state for more than one cycle of the PWM cycle is executed starting from timing $T_{A2}$. Therefore, it is can also be considered that the start time of the off-skip control is timing $T_{A2}$.

At the stage of timing $T_{A3}$, the clamping operation by the clamp circuit 116 is started from timing $T_{A3}$ based on the detection that the switching of the high-low relationship between the comparison voltage Vc and the ramp voltage Vramp does not occur for one cycle (tp_pwm) of the PWM cycle. The clamping operation is stopped until timing $T_{A3}$.

Thereafter, at timing $T_{A4}$, the input voltage Vin returns from a state lower than the target voltage Vtg to a state higher than the target voltage Vtg. Along with this return, the output voltage Vout starts to rise toward the target voltage Vtg, and the comparison voltage Vc decreases as the output voltage Vout rises. As the state of "Vc>Vramp" is switched to the state of "Vc<Vramp" at timing $T_{A5}$ in the process of lowering the comparison voltage Vc, the signal Spwm is switched from the high level to the low level. That is, in the example of FIG. 10, the signal Spwm is switched from the low level to the high level at timing $T_{A2}$. Then, the signal Spwm is maintained at the high level until immediately before timing $T_{A5}$. The signal Spwm is switched from the high level to the low level at timing $T_{A5}$.

In response to the switching of the signal Spwm to the low level at timing $T_{A5}$, the logic circuit 120 switches the execution control from the pulse skip control to the PWM control and terminates (stops) the clamping operation. As a result, in the example of FIG. 10, the voltage of the node $ND_A$ is clamped with the clamp voltage Vclmp between timings $T_{A3}$ and $T_{A5}$. In the example of FIG. 10, after timing $T_{A5}$, the comparison voltage Vc is maintained within the fluctuation range of the ramp voltage Vramp, and the output voltage Vout is stabilized at the target voltage Vtg through the execution of the PWM control.

In this way, when it is detected after the start of the PWM control that the switching of the high-low relationship between the comparison voltage Vc and the ramp voltage Vramp does not occur for more than one cycle of the PWM cycle (timing $T_{A3}$), the logic circuit 120 switches the execution control from the PWM control to the off-skip control and starts the clamping operation. Thereafter, when the switching of the high-low relationship between the comparison voltage Vc and the ramp voltage Vramp is detected (timing $T_{A5}$), the logic circuit 120 returns the execution control to the PWM control and terminates the clamping operation.

As described above, in the switching power supply device 1A, the error between the output voltage Vout and the target voltage Vtg is integrated over a relatively long time through the use of the capacitor 115*b*, and the on-duty in the PWM control is adjusted relatively gently. As a result, the output voltage Vout can be stabilized with high accuracy. In the reference switching power supply device 1' of FIG. 6, the above error is integrated in the capacitor 115*b* during the period in which the output voltage Vout is lower than the target voltage Vtg due to the decrease in the input voltage Vin. After the input voltage Vin is restored, the integrated content (the information indicating that the output voltage Vout is lower than the target voltage Vtg) acts in such a direction as to excessively push up the output voltage Vout, thereby generating an overshoot. On the other hand, in the switching power supply device 1A of FIG. 3, the above error is not integrated in the capacitor 115*b* during the period in which the output voltage Vout is lower than the target voltage Vtg due to the decrease in the input voltage Vin, and the charging voltage of the capacitor 115*b* is clamped with the clamp voltage Vclmp. Therefore, by appropriately setting the clamp voltage Vclmp, it is possible to suppress the overshoot that may occur immediately after the input voltage Vin is restored.

The first embodiment includes following Examples EX1_1 to EX1_7. Unless otherwise specified and unless contradictory, the matters described above in connection with the first embodiment are applied to the following Examples EX1_1 to EX1_7. In each of the Examples, for matters that are inconsistent with the matters described above in connection with the first embodiment, the description in each of the Examples may be prioritized. Further, to the extent there is no contradiction, the matters described in any of Examples EX1_1 to EX1_7 may be applied to any other Example (that is, two or more Examples among the plurality of Examples may be combined with each other).

EXAMPLE EX1_1

Figure 11:
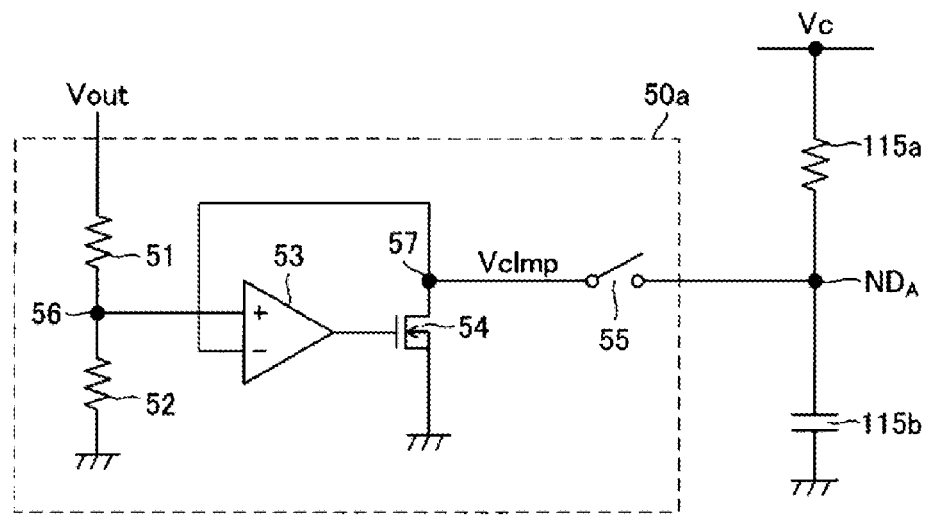
FIG. 11 is a diagram showing a configuration of a clamp circuit according to Example EX1_1 belonging to the first embodiment of the present disclosure.

Example EX1_1 will be described. FIG. 11 shows a configuration of a clamp circuit 50*a* according to Example EX1_1. The clamp circuit 50*a* may be used as the clamp circuit 116. The clamp circuit 50*a* includes resistors 51 and 52, an amplifier 53, a transistor 54 configured as an N-channel type MOSFET, and a switch 55. An output voltage Vout is applied to one end of the resistor 51, the other end of the resistor 51 is connected to one end of the resistor 52 at a node 56, and the other end of the resistor 52 is connected to the ground. The non-inverting input terminal of the amplifier 53 is connected to the node 56, and the output terminal of the amplifier 53 is connected to the gate of the transistor 54. The drain of the transistor 54 and the inverting input terminal of the amplifier 53 are commonly connected at a node 57, and the source of the transistor 54 is connected to the ground.

Therefore, a divided voltage of the output voltage Vout is applied to the connection node 56 between the resistors 51 and 52, and a voltage having the same voltage value as the voltage at the node 56 is applied to the node 57 by the action of the amplifier 53 and the transistor 54. The voltage applied to the node 57 functions as a clamp voltage Vclmp. The switch 55 is inserted between the node 57 and the node $ND_A$. The on/off state of the switch 55 is controlled by a logic circuit 120. Only when the switch 55 is turned on, the voltage at the node 57 (i.e., the clamp voltage Vclmp) is set at the node $ND_A$, and the voltage at the node NDA is maintained at the voltage at the node 57 (i.e., the clamp voltage Vclmp). This is equivalent to performing a clamping operation. When the switch 55 is turned off, the connection between the node 57 to which the clamp voltage Vclmp is applied and the node $ND_A$ is cut off, whereby the clamping operation is stopped.

By using the clamp circuit 50a, the charging voltage of the capacitor 115b can be caused to wait at an appropriate voltage corresponding to the output voltage Vout during the period in which the output voltage Vout is lower than the target voltage Vtg due to the decrease in the input voltage Vin. It is possible to immediately optimize the on-duty of PWM control after the input voltage Vin is restored.

It may be considered that a clamp circuit is formed by the resistors 51 and 52, the amplifier 53, and the transistor 54, and the switch 55 is inserted between the clamp circuit and the node NDA. In addition, it is possible to appropriately modify the transistor 54 to a bipolar transistor.

EXAMPLE EX1_2

Figure 12:
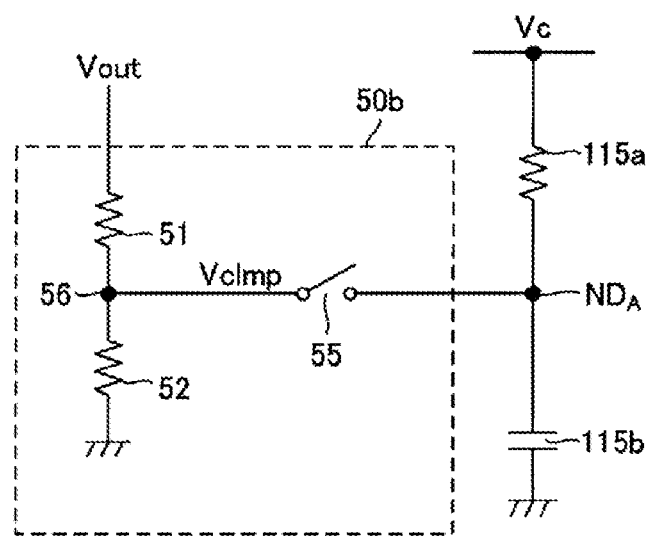
FIG. 12 is a diagram showing a configuration of a clamp circuit according to Example EX1_2 belonging to the first embodiment of the present disclosure.

Example EX1_2 will be described. FIG. 12 shows a configuration of a clamp circuit 50b according to Example EX1_2. The clamp circuit 50b may be used as the clamp circuit 116. The clamp circuit 50b includes resistors 51 and 52 and a switch 55. The clamp circuit 50b corresponds to the clamp circuit 50a of FIG. 11 from which the amplifier 53 and the transistor 54 are removed. That is, in the clamp circuit 50b, an output voltage Vout is applied to one end of the resistor 51, the other end of the resistor 51 is connected to one end of the resistor 52 at a node 56, and the other end of the resistor 52 is connected to the ground. In the clamp circuit 50b, a divided voltage of the output voltage Vout is applied to the connection node 56 between the resistors 51 and 52, and the voltage applied to the node 56 functions as a clamp voltage Vclmp.

In the clamp circuit 50b, the switch 55 is inserted between the node 56 and the node $ND_A$. The on/off state of the switch 55 is controlled by the logic circuit 120. Only when the switch 55 is turned on, the voltage at the node 56 (i.e., the clamp voltage Vclmp) is set at the node $ND_A$, and the voltage at the node $ND_A$ is maintained at the voltage at the node 56 (i.e., the clamp voltage Vclmp). This is equivalent to performing a clamping operation. When the switch 55 is turned off, the connection between the node 56 to which the clamp voltage Vclmp is applied and the node $ND_A$ is cut off, whereby the clamping operation is stopped.

Even if the clamp circuit 50b is used, it is possible to obtain the same operation and effect as in the case of using the clamp circuit 50a. It may be considered that a clamp circuit is formed by the resistors 51 and 52, and the switch 55 is inserted between the clamp circuit and the node $ND_A$.

EXAMPLE EX1_3

Figure 13:
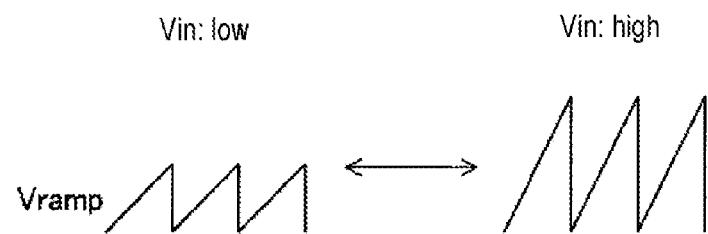
FIG. 13 is a diagram showing a relationship between the amplitude of the ramp voltage and the input voltage according to Example EX1_3 belonging to the first embodiment of the present disclosure.

Example EX1_3 will be described. In Example EX1_3, it is assumed that the clamp circuit 50a of FIG. 11 or the clamp circuit 50b of FIG. 12 is used as the clamp circuit 116 of FIG. 3. When the clamp circuit 50a or 50b is used, the clamp voltage Vclmp is proportional to the output voltage Vout. Under this assumption, in Example EX1_3, as shown in FIG. 13, the amplitude of the ramp voltage Vramp is allowed to be proportional to the input voltage Vin. At this time, it is preferable to fix the lower limit voltage value Vramp_MIN of the ramp voltage Vramp and then allow the difference voltage value (Vramp_MAX−Vramp_MIN) to be proportional to the input voltage Vin (see FIG. 4).

Figure 14A:
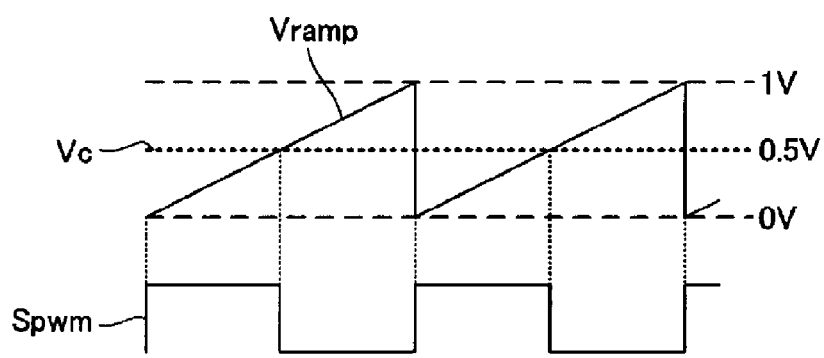
FIGS. 14A and 14B are waveform diagrams of the ramp voltage, the comparison voltage and the pulse-width-modulated signal according to Example EX1_3 belonging to the first embodiment of the present disclosure.
Figure 14B:
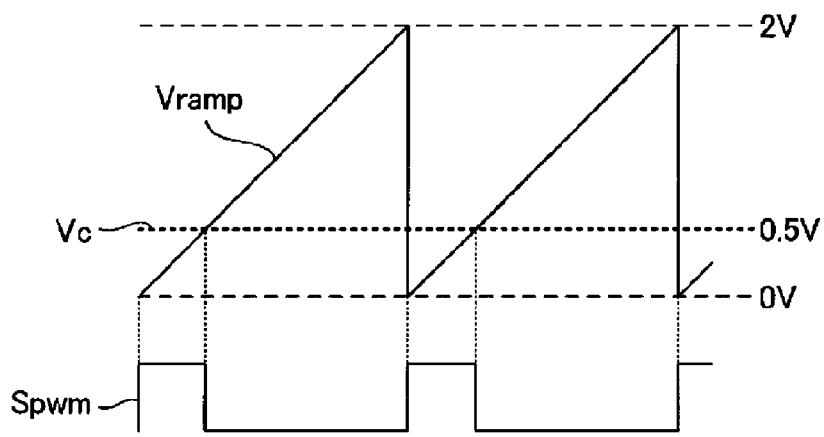

The significance of the method of Example EX1_3 will be described with reference to FIGS. 14A and 14B. Now, for the sake of concrete explanation, it is assumed that the lower limit voltage value Vramp MIN is 0V and the target voltage Vtg is 5V. Further, it is assumed that when the input voltage Vin is 10V, the amplitude of the ramp voltage Vramp is 1.0V.

Then, when the input voltage Vin is 20V, the amplitude of the ramp voltage Vramp is 2.0V. FIG. 14A shows waveforms of the comparison voltage Vc, the ramp voltage Vramp and the signal Spwm when the input voltage Vin is maintained at 10V, and FIG. 14B shows waveforms of the comparison voltage Vc, the ramp voltage Vramp and the signal Spwm when the input voltage Vin is maintained at 20V.

Under the assumption that the output voltage Vout is stabilized at 5V, which is the target voltage Vtg, and the output current Iout is constant, the on-duty in PWM control (the ratio occupied by the period of the output high state in each PWM cycle) is 50% if the input voltage Vin is 10V, and 25% if the input voltage Vin is 20V. This means that when the input voltage Vin is 10V, the comparison voltage Vc is maintained at about 0.5V, and when the input voltage Vin is 20V, the comparison voltage Vc is maintained at about 0.5V.

Although there has been the case where the target voltage Vtg is 5V, if the target voltage Vtg becomes 6V, which is 1.2 times as high as the 5V, the comparison voltage Vc is maintained at about 0.6V regardless of the input voltage Vin. If the target voltage Vtg becomes 4V, which is 0.8 times as high as the 5V, the comparison voltage Vc is maintained at about 0.4V regardless of the input voltage Vin. That is, when the amplitude of the ramp voltage Vramp is allowed to be proportional to the input voltage Vin, the comparison voltage Vc in the PWM control depends only on the output voltage Vout.

Then, if the clamp voltage Vclmp is determined according to the output voltage Vout (for example, if the clamp voltage Vclmp has a value that matches or approximates the value of the comparison voltage Vc when the output voltage Vout is stabilized at the target voltage Vtg by PWM control), the charging voltage of the capacitor 115b can be kept on standby at an appropriate voltage corresponding to the output voltage Vout during the period in which the output voltage Vout is lower than the target voltage Vtg due to the decrease in the input voltage Vin. After the input voltage Vin is restored, the on-duty of PWM control can be immediately optimized.

Figure 15:
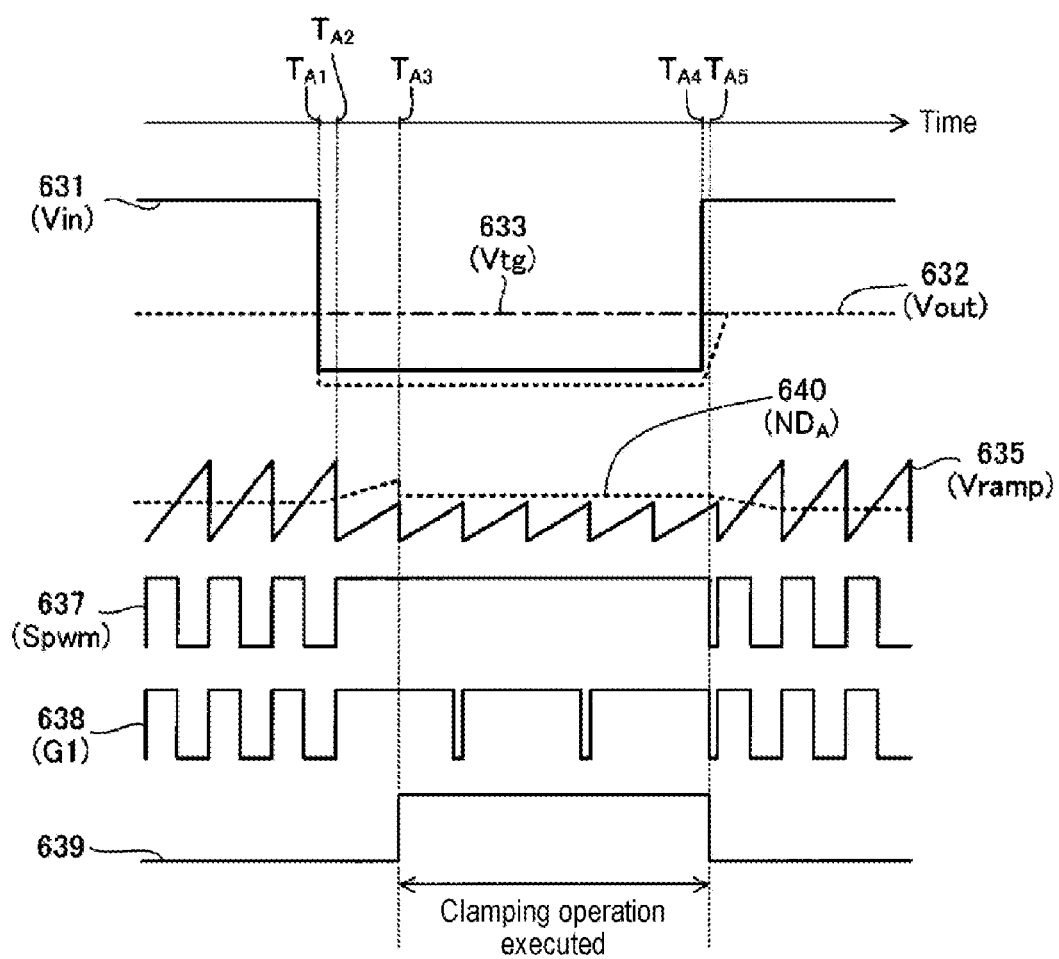
FIG. 15 is a timing chart of a switching power supply device according to Example EX1_3 belonging to the first embodiment of the present disclosure.

FIG. 15 shows a partial waveform of the switching power supply device 1A according to Example EX1_3. In FIG. 15, a solid line 631, a broken line 632, a one-dot chain line 633 and a solid line 635 indicate schematic waveforms of the input voltage Vin, the output voltage Vout, the target voltage Vtg and the ramp voltage Vramp, respectively, in the switching power supply device 1A according to Example EX1_3. A solid line 637 and a solid line 638 indicate schematic waveforms of the signal Spwm and the gate signal Gl, respectively, in the switching power supply device 1A according to Example EX1_3. A solid line 639 indicates the operating state of the clamp circuit 116. A broken line waveform 640 indicates the voltage waveform of the node NDA in the switching power supply device 1A according to Example EX1_3. The significance of timings $T_{A1}$ to $T_{A5}$ shown in FIG. 15 is as described above (see FIG. 10). During the operation of the clamp circuit 116, the voltage of the node $ND_A$ is kept at an appropriate voltage corresponding to the output voltage Vout.

When the amplitude of the ramp voltage Vramp is set according to the input voltage Vin, the ramp voltage generation circuit 117 can set the amplitude of the ramp voltage Vramp for each PWM cycle based on the input voltage Vin at the start time of the PWM cycle. As used herein, the start time of the PWM cycle refers to the timing at which the ramp voltage Vramp takes the minimum voltage (Vramp_MIN). Therefore, for example, when the value of the input voltage Vin is changed from a first voltage value to a second voltage value in the middle of an i-th PWM cycle, the amplitude of the ramp voltage Vramp in the i-th PWM cycle is proportional to the first voltage value, and the amplitude of the ramp voltage Vramp in the (i+1)-th PWM cycle is proportional to the second voltage value (where i is an integer).

As described above, it is preferable to combine Example EX1_1 or EX1_2 with Example EX1_3. However, it is also possible to fix the amplitude of the ramp voltage Vramp in Example EX1_1 or EX1_2 without relying on the input voltage Vin.

EXAMPLE EX1_4

Figure 16:
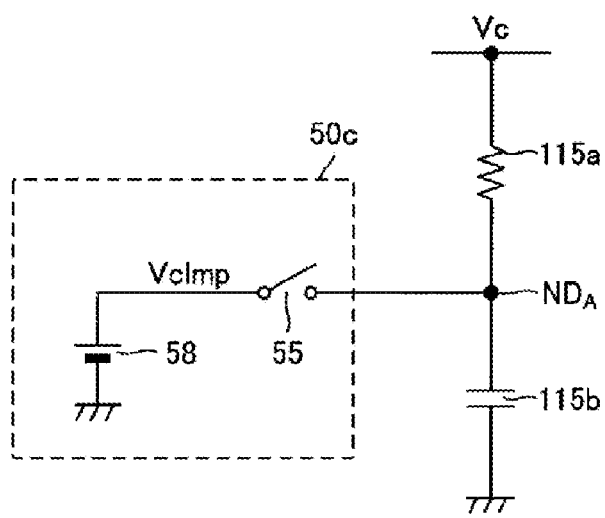
FIG. 16 is a diagram showing a configuration of a clamp circuit according to Example EX1_4 belonging to the first embodiment of the present disclosure.

Example EX1_4 will be described. FIG. 16 shows a configuration of a clamp circuit 50c according to Example EX1_4. The clamp circuit 50c can be used as the clamp circuit 116. The clamp circuit 50c includes a voltage source 58 that generates a predetermined fixed voltage as a clamp voltage Vclmp, and a switch 55. The switch 55 is inserted between a node to which the predetermined fixed voltage is applied and a node $ND_A$.

The on/off state of the switch 55 is controlled by a logic circuit 120. Only when the switch 55 is turned on, the clamp voltage Vclmp as a fixed voltage is set in the node $ND_A$, and the voltage at the node $ND_A$ is maintained at the fixed voltage (i.e., the clamp voltage Vclmp). This is equivalent to performing a clamping operation. When the switch 55 is turned off, the connection between the node to which the fixed voltage is applied and the node $ND_A$ is cut off, whereby the clamping operation is stopped.

In applications in which the fluctuation range of the input voltage Vin is limited, Example EX1_4 may be sufficient. For example, in an application in which the input voltage Vin is only one of a first predetermined voltage higher than the target voltage Vtg and a second predetermined voltage lower than the target voltage Vtg, the fixed voltage may be optimized based on the first predetermined voltage.

EXAMPLE EX1_5

Example EX1_5 will be described. A clamp diode (not shown) may be provided in a clamp circuit 116 to clamp the voltage of a node $ND_A$ through the clamp diode in a clamping operation. In this case, the clamping operation is an operation that prevents (prohibits) the voltage at the node $ND_A$ from being higher than the clamp voltage Vclmp while allowing the voltage at the node $ND_A$ to be lower than the clamp voltage Vclmp.

That is, for example, when the clamp circuit 50a of FIG. 11 is used as the clamp circuit 116, a clamp diode may be inserted between the node 57 and the switch 55 so that the anode of the clamp diode is connected to one end of the switch 55 and the cathode of the clamp diode is connected to the node 57. In this case, a voltage higher than the voltage at the node 57 by the forward voltage of the clamp diode functions as the clamp voltage Vclmp.

Similarly, for example, when the clamp circuit 50b of FIG. 12 is used as the clamp circuit 116, a clamp diode may be inserted between the node 56 and the switch 55 so that the anode of the clamp diode is connected to one end of the switch 55 and the cathode of the clamp diode is connected to the node 56. In this case, a voltage higher than the voltage at the node 56 by the forward voltage of the clamp diode functions as the clamp voltage Vclmp.

Similarly, for example, when the clamp circuit 50c of FIG. 16 is used as the clamp circuit 116, a clamp diode may be inserted between the voltage source 58 and the switch 55 so that the anode of the clamp diode is connected to one end of the switch 55 and the cathode of the clamp diode is connected to the output end of the voltage source 58 (the terminal to which the fixed voltage outputted from the voltage source 58 is applied). In this case, a voltage higher than the output voltage of the voltage source 58 by the forward voltage of the clamp diode functions as the clamp voltage Vclmp.

EXAMPLE EX1_6

Example EX1_6 will be described. The method of controlling the execution or non-execution of the clamping operation based on the high-low relationship between the comparison voltage Vc and the ramp voltage Vramp (in other words, based on the signal Spwm) has been described above. However, the execution or non-execution of the clamping operation may be controlled based on the ratio between the input voltage Vin and the output voltage Vout. This is because, when the input voltage Vin drops to below the target voltage Vtg, the ratio "Vout/Vin" becomes considerably large and the ratio "Vin/Vout" becomes considerably small.

The ratio between the input voltage Vin and the output voltage Vout includes a first ratio (Vout/Vin), which is a ratio of the output voltage Vout to the input voltage Vin, and a second ratio (Vin/Vout), which is a ratio of the input voltage Vin to the output voltage Vout.

The first ratio (Vout/Vin) may be used as follows. The logic circuit 120 monitors the first ratio (Vout/Vin), and executes the clamping operation when the first ratio (Vout/Vin) becomes equal to or larger than a predetermined determination value Rth_a1 starting from the state in which the clamping operation is stopped. The determination value Rth_a1 is a predetermined value (e.g., 0.9) which is smaller than 1 and close to 1. The determination value Rth_a1 is set so that the first ratio (Vout/Vin) becomes equal to or larger than the predetermined determination value Rth_a1 when the input voltage Vin is lower than the target voltage Vtg or is equal to or higher than the target voltage Vtg and sufficiently close to the target voltage Vtg. Therefore, when the clamping operation is executed based on the fact that the first ratio (Vout/Vin) is equal to or larger than the determination value Rth_a1, it is expected that the off-skip control is also executed. That is, the clamping operation is executed in conjunction with the execution of the off-skip control. After the execution of the clamping operation is started, the logic circuit 120 stops the clamping operation when the first ratio (Vout/Vin) becomes equal to or smaller than a predetermined determination value Rth_a2. The determination value Rth_a2 is smaller than the determination value Rth_a1 by a predetermined hysteresis value.

The second ratio (Vin/Vout) may be used as follows. The logic circuit 120 monitors the second ratio (Vin/Vout), and executes the clamping operation when the second ratio (Vin/Vout) becomes equal to or smaller than a predetermined determination value Rth_b1 starting from the state in which the clamping operation is stopped. The determination value Rth_b1 is a predetermined value (e.g., 1.1) which is larger than 1 and close to 1. The determination value Rth_b1 is set so that the second ratio (Vin/Vout) becomes equal to or smaller than the predetermined determination value Rth_b1 when the input voltage Vin is lower than the target voltage Vtg or is equal to or higher than the target voltage Vtg and sufficiently close to the target voltage Vtg. Therefore, when the clamping operation is executed based on the fact that the second ratio (Vin/Vout) is equal to or smaller than the determination value Rth_b1, it is expected that the off-skip control is also executed. That is, the clamping operation is executed in conjunction with the execution of the off-skip control. After the execution of the clamping operation is started, the logic circuit 120 stops the clamping operation when the second ratio (Vin/Vout) becomes equal to or larger than a predetermined determination value Rth_b2. The determination value Rth_b2 is larger than the determination value Rth_b1 by a predetermined hysteresis value.

EXAMPLE EX1_7

Example EX1_7 will be described. In the phase compensation circuit 115, in addition to the resistor 115a and the capacitor 115b described above, a passive element other than the resistor 115a and the capacitor 115b may be provided. For example, another resistor may be connected in parallel to the series circuit of the resistor 115a and the capacitor 115b, or another capacitor may be connected in parallel to the series circuit of the resistor 115a and the capacitor 115b.

Second Embodiment

A second embodiment of the present disclosure will be described. The second embodiment and the below-described third embodiment are embodiments based on the first embodiment. As for the matters not particularly described in the second and third embodiments, the description of the first embodiment is also applied to the second and third embodiments unless there is a contradiction. In interpreting the description of the second embodiment, the description of the second embodiment may be prioritized for matters that conflict between the first and second embodiments (the same applies to the third embodiment described later). To the extent there is no contradiction, arbitrary embodiments among the first to third embodiments may be combined with each other.

The method of controlling the switching power supply device 1 to which the present disclosure is applied is arbitrary. Therefore, for example, a switching power supply device 1B shown in FIG. 17 may be configured. The switching power supply device 1B is another example of the switching power supply device 1 of FIG. 1. A voltage mode control method is adopted in the switching power supply device 1B. The switching power supply device 1B is provided with a switching power supply IC 2B as the switching power supply IC 2. The switching power supply IC 2B is provided with an output stage circuit MM and a main control circuit 3B as the main control circuit 3. The above-described matters regarding the switching power supply device 1, the switching power supply IC 2 and the main control circuit 3 are all applied to the switching power supply device 1B, the switching power supply IC 2B and the main control circuit 3B to the extent there is no contradiction.

The main control circuit 3B includes an error amplifier 214, a phase compensation circuit 215, a clamp circuit 216, a ramp voltage generation circuit 217, a comparator (PWM comparator) 218, and a logic circuit 220.

The error amplifier 214 is a current output type transconductance amplifier. A voltage applied to the feedback terminal FB (i.e., a feedback voltage Vfb) is supplied to the inverting input terminal of the error amplifier 214, and a predetermined reference voltage Vref2 is supplied to the non-inverting input terminal of the error amplifier 214. The reference voltage Vref2 is a DC voltage having a positive predetermined voltage value, and is generated by a reference voltage generation circuit (not shown) in the IC 2B. The error amplifier 214 outputs an error current signal 13 corresponding to the difference between the feedback voltage Vfb and the reference voltage Vref2 from its own output terminal. The electric charge due to the error current signal 13 is inputted to and outputted from a wiring WR3 which is an error signal wiring.

Specifically, when the feedback voltage Vfb is lower than the reference voltage Vref2, the error amplifier 214 outputs a current due to the error current signal 13 from the error amplifier 214 toward the wiring WR3 so that the potential of the wiring WR3 rises. When the feedback voltage Vfb is higher than the reference voltage Vref2, the error amplifier 214 inputs the current due to the error current signal 13 from the wiring WR3 toward the error amplifier 214 so that the potential of the wiring WR3 drops. As the absolute value of the difference between the feedback voltage Vfb and the reference voltage Vref2 increases, the magnitude of the current due to the error current signal 13 also increases.

The phase compensation circuit 215 is provided between the wiring WR3 and the ground. The phase compensation circuit 215 receives an input of the current signal 13 to generate a comparison voltage Vc on the wiring WR3. The comparison voltage Vc in the second embodiment refers to a voltage generated on the wiring WR3 by the error amplifier 214 and the phase compensation circuit 215. The phase compensation circuit 215 is provided to compensate the phase of the comparison voltage Vc. The phase compensation circuit 215 includes a series circuit of a resistor 215a and a capacitor 215b. Specifically, one end of the resistor 215a is connected to the wiring WR3, and the other end of the resistor 215a is connected to the ground via the capacitor 215b. By appropriately setting the resistance value of the resistor 215a and the capacitance value of the capacitor 215b, the phase of the comparison voltage Vc can be compensated to prevent oscillation of an output feedback loop. The resistor 215a and the capacitor 215b function as a phase compensation resistor and a phase compensation capacitor, respectively, for compensating the phase of the comparison voltage Vc. The connection node between the resistor 215a and the capacitor 215b is referred to as node $ND_B$.

The clamp circuit 216 is connected to the node $ND_B$. At a required timing, the clamp circuit 216 clamps the voltage of the node $ND_B$ with a clamp voltage Vclmp set by itself.

The ramp voltage generation circuit 217 is the same as the ramp voltage generation circuit 117 according to the first embodiment, and performs the same operation as the ramp voltage generation circuit 117 according to the first embodiment.

The comparator 218 is the same as the comparator 118 according to the first embodiment, and performs the same operation as the comparator 118 according to the first embodiment. However, the comparison voltage Vc on the wiring WR3 is supplied to the non-inverting input terminal of the comparator 218, and the ramp voltage Vramp from the ramp voltage generation circuit 217 is supplied to the inverting input terminal of the comparator 218. The comparator 218 compares the comparison voltage Vc with the ramp voltage Vramp and outputs a pulse width modulation signal Spwm indicating a comparison result. As described above, the pulse width modulation signal Spwm becomes a high level during a period in which the comparison voltage Vc is higher than the ramp voltage Vramp, and becomes a low level during a period in which the comparison voltage Vc is lower than the ramp voltage Vramp.

The logic circuit 220 is the same as the logic circuit 120 according to the first embodiment, and performs the same operation as the logic circuit 120 according to the first embodiment. However, the pulse width modulation signal Spwm to the logic circuit 220 is supplied from the comparator 218. Therefore, the logic circuit 220 causes the output stage circuit MM to perform a switching operation by supplying the gate signals G1 and G2 based on the pulse width modulation signal Spwm from the comparator 218 to the transistors M1 and M2. In the switching operation, the transistors M1 and M2 are alternately turned on and off based on the signal Spwm. The error amplifier 214 generates the current signal 13 so that the feedback voltage Vfb and the reference voltage Vref2 are equal to each other. Therefore, through the execution of the switching operation, the output voltage Vout is stabilized at a predetermined target voltage Vtg according to the reference voltage Vref3 and the voltage division ratio by the resistors R1 and R2.

As described above, basically, when the comparison voltage Vc falls within the fluctuation range of the ramp voltage Vramp and the comparison voltage Vc is maintained within the fluctuation range of the ramp voltage Vramp, the PWM control described in the first embodiment is performed.

The configuration of the clamp circuit 216 is the same as that of the clamp circuit 116. The operating conditions and operating contents of the off-skip control are also the same as described in the first embodiment. In addition, the contents shown in Examples EX1_1 to EX1_7 can also be applied to the second embodiment.

When the description of the first embodiment is applied to the second embodiment, the amplifier 114, the phase compensation circuit 115, the clamp circuit 116, the ramp voltage generation circuit 117, the comparator 118 and the logic circuit 120 in the first embodiment may be respectively replaced by the amplifier 214, the phase compensation circuit 215, the clamp circuit 216, the ramp voltage generation circuit 217, the comparator 218 and the logic circuit 220 in the second embodiment. The current signal 12, the wiring WR2, the resistor 115a, the capacitor 115b and the node NDA in the first embodiment may be respectively replaced by the current signal 13, the wiring WR3, the resistor 215a, the capacitor 215b and the node $ND_B$ in the second embodiment.

Figure 17:
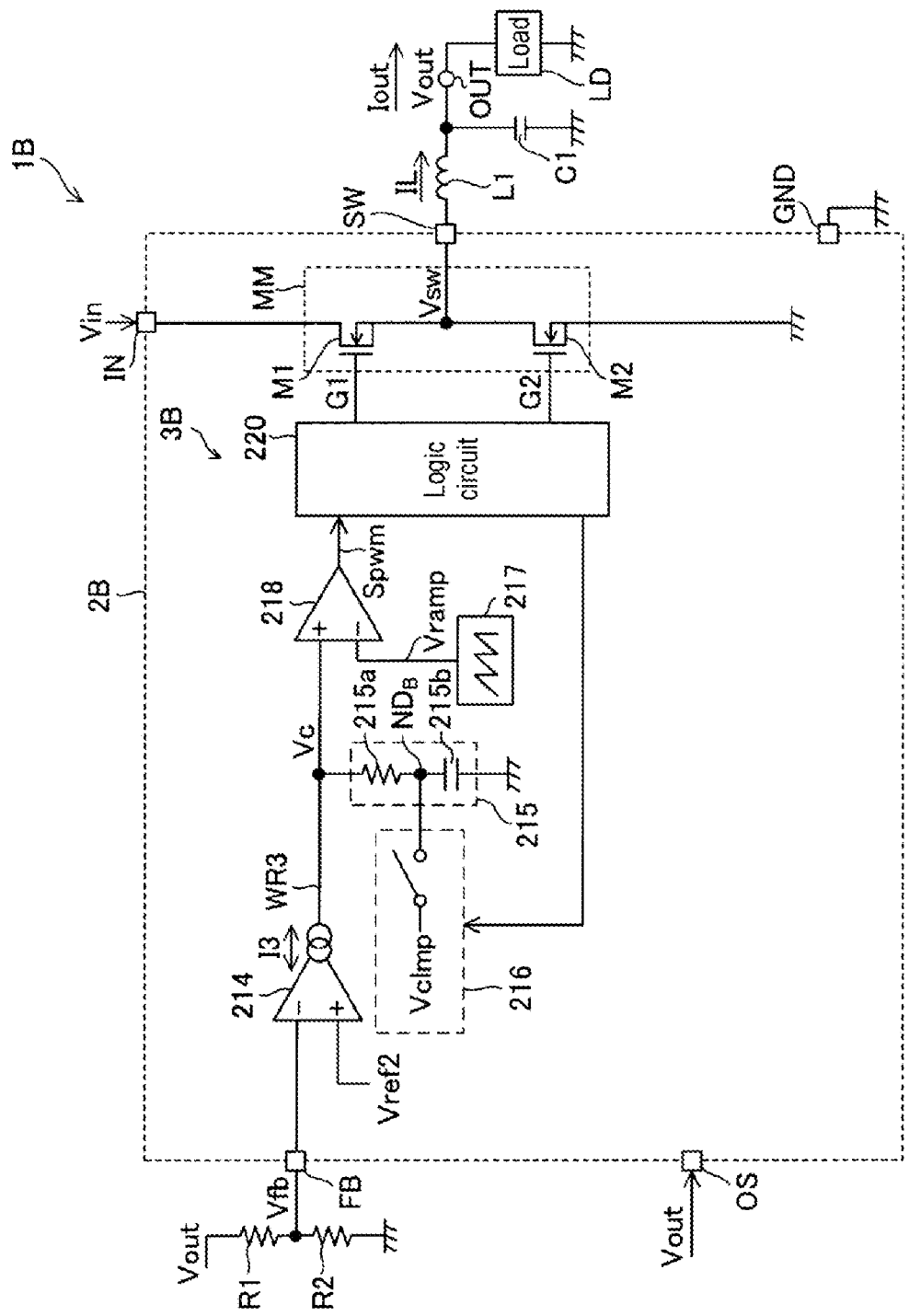
FIG. 17 is a configuration diagram of a switching power supply device according to a second embodiment of the present disclosure.

Therefore, for example, when the clamp circuit 50a of FIG. 11 is used as the clamp circuit 216 of FIG. 17, a switch 55 is inserted between the node 57 and the node $ND_B$ in the clamp circuit 50a, and the on/off state of the switch 55 is controlled by the logic circuit 220.

Third Embodiment

A third embodiment of the present disclosure will be described. In the third embodiment, a technique that can be implemented in combination with the first or second embodiment, or a modification technique that can be applied to the first and second embodiments will be described. The third embodiment includes the following Examples EX3_1 to EX3_3 that can be combined with each other.

EXAMPLE EX3_1

Figure 18:
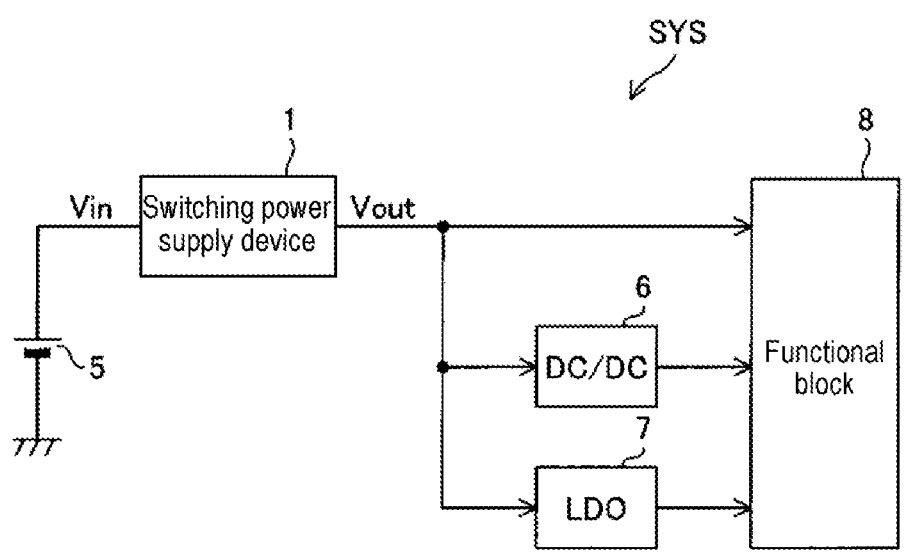
FIG. 18 is a configuration diagram of a system according to a third embodiment of the present disclosure.
Figure 19:
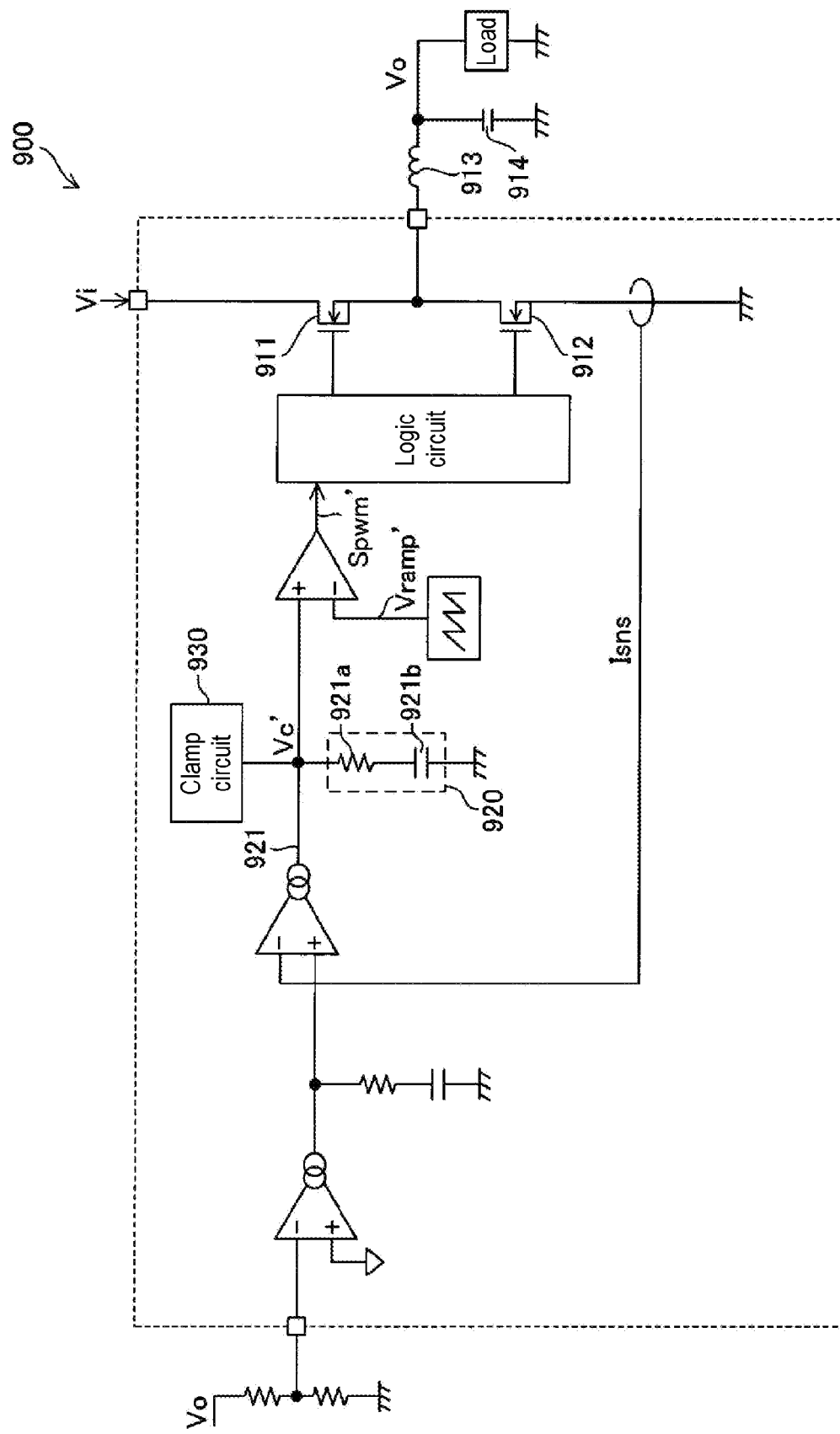
FIG. 19 is a configuration diagram of a switching power supply device according to a reference configuration.

Example EX3_1 will be described. FIG. 18 shows an overall configuration of a system SYS in which the switching power supply device 1 is incorporated. The system SYS may be mounted on a vehicle such as an automobile or the like, in which case the system SYS functions as an in-vehicle system. The switching power supply device 1 in the system SYS may be the above-described switching power supply device 1A or 1B. The system SYS includes a switching power supply device 1, a voltage source 5 that supplies an input voltage Vin to the switching power supply device 1, a DC/DC converter 6, an LDO (Low Drop Out) regulator 7 and a functional block 8 that receive an output voltage Vout from the switching power supply device 1. The target voltage Vtg of the output voltage Vout is, for example, 5V or 3.3V.

The voltage source 5 may be a battery mounted on a vehicle. The DC/DC converter 6 and the LDO regulator 7 generate a desired DC voltage based on the output voltage Vout of the switching power supply device 1, and supply the generated DC voltage to the functional block 8. The functional block 8 includes one or more electronic devices that operate based on the output voltage Vout from the switching power supply device 1 or the DC voltage from the DC/DC converter 6 or the LDO regulator 7. When the system SYS is an in-vehicle system, the electronic devices may be arbitrary electronic devices mounted on a vehicle, for example, a car navigation device, a digital meter, an airbag, various ECUs (Electronic Control Units), sensors, or individual components that constitute an advanced driver assistance system.

In in-vehicle applications, the output voltage of the battery as the voltage source 5 drops sharply when an engine is started, and then rises. For this reason, in-vehicle component standards stipulate tests for battery output voltage fluctuation. If a large overshoot occurs in the output voltage Vout of the switching power supply device 1 in response to such fluctuation in the output voltage of the battery, the electronic device in the subsequent stage may be adversely affected and the electronic device may be damaged. By using the switching power supply device 1, it is possible to suppress the overshoot of the output voltage Vout to an extremely small value with respect to the fluctuation of the output voltage of the battery (e.g., an overshoot of 50 mV or less).

Further, the fact that the overshoot can be made small means that it is possible to allow the reduction of the capacitance of the output capacitor C1. Thus, the capacitance of the output capacitor C1 required for suppressing the overshoot to a specified value or less can be suppressed to a low level. This contributes to cost reduction and resource saving.

EXAMPLE EX3_2

Example EX3_2 will be described. In the switching power supply IC 2 (2A or 2B), it is also possible to directly input the output voltage Vout to the feedback terminal FB. In this case, the feedback voltage Vfb becomes the output voltage Vout itself. Even if the feedback voltage Vfb is the output voltage Vout itself, the feedback voltage Vfb is still the feedback voltage according to the output voltage Vout.

EXAMPLE EX3_3

Example EX3_3 will be described.

Each circuit element of the switching power supply IC 2 (2A or 2B) is formed in the form of a semiconductor integrated circuit. A semiconductor device is configured by enclosing the semiconductor integrated circuit in a housing (package) made of a resin. Alternatively, a plurality of discrete components may be used to form a circuit equivalent to the circuit in the IC 2 (2A or 2B). Some of the above-described circuit elements (e.g., the transistors M1 and M2) included in the IC 2 (2A or 2B) may be provided outside the IC 2 (2A or 2B) and externally connected to the IC 2 (2A or 2B).

For any arbitrary signal or voltage, the high-level and low-level relationship may be reversed as long as it does not compromise the above-mentioned gist.

The transistor M1 may be configured by a P-channel type MOSFET. In this case, the voltage level supplied to the gate of the transistor M1 is modified from the above-described content so as to realize the aforementioned switching operation. In addition, the channel type of the FET can be changed arbitrarily.

Each of the above-described transistors may be any kind of transistor. For example, the transistor described above as a MOSFET may be replaced with a junction type FET, an IGBT (Insulated Gate Bipolar Transistor) or a bipolar transistor. The arbitrary transistor includes a first electrode, a second electrode and a control electrode. In the FET, one of the first and second electrodes is a drain, the other is a source, and the control electrode is a gate. In the IGBT, one of the first and second electrodes is a collector, the other is an emitter, and the control electrode is a gate. In the bipolar transistor that does not belong to the IGBT, one of the first and second electrodes is a collector, the other is an emitter, and the control electrode is a base.

Consideration of the Present Disclosure

The present disclosure embodied in the above-described embodiments is considered.

The switching power supply device according to one aspect of the present disclosure includes: an output stage circuit (MM) including an output transistor (M1) installed between an application end of an input voltage (Vin) and an application end of an output voltage (Vout), and configured to generate the output voltage from the input voltage through a switching operation including an operation of switching the output transistor; and a main control circuit (3, 3A or 3B) configured to execute PWM control for causing the output stage circuit to perform the switching operation at a predetermined PWM frequency based on a feedback voltage (Vfb) according to the output voltage, wherein the main control circuit includes a comparison voltage generator configured to generate a comparison voltage (Vc) on a specific wiring (WR2 or WR3) according to the feedback voltage, a phase compensation circuit (115 or 215) connected to the specific wiring and configured to compensate a phase of the comparison voltage, a ramp voltage generation circuit (117 or 217) configured to generate a ramp voltage (Vramp) whose voltage value is changed periodically in a PWM cycle, and a PWM comparator (118 or 218) configured to compare the comparison voltage with the ramp voltage to output a signal (Spwm) indicating a comparison result, wherein the main control circuit is configured to control the output stage circuit based on an output signal of the PWM comparator, the phase compensation circuit includes a phase compensation resistor (115a or 215a) installed between the specific wiring and a predetermined node (NDA or NDB), and a phase compensation capacitor (115b or 215b) installed between the predetermined node and a reference conductive portion (ground) having a predetermined potential, and the main control circuit further includes a clamp circuit (116 or 216) configured to perform a clamping operation for generating a clamp voltage (Vclmp) and clamping a voltage at the predetermined node with the clamp voltage.

In the switching power supply device, the error between the output voltage and the target voltage of the output voltage is integrated over a relatively long time through the use of the phase compensation capacitor, and the on-duty in PWM control is adjusted relatively gently, whereby the output voltage can be stabilized with high accuracy. In this type of switching power supply device, the error is integrated in the phase compensation capacitor during the period in which the output voltage is lower than the target voltage due to the decrease in the input voltage. After the input voltage is restored, there is a concern that the integrated content (the information that the output voltage is lower than the target voltage) may work in such a direction as to push up the output voltage excessively (there is a concern that a large overshoot may occur). In consideration of this, the switching power supply device according to the present disclosure makes it possible to clamp the voltage at the predetermined node to which the phase compensation capacitor is connected. Therefore, during the period in which the output voltage is lower than the target voltage due to the decrease in the input voltage, the charging voltage of the phase compensation capacitor can be clamped with the clamp voltage without integrating the error in the phase compensation capacitor. As a result, by setting the clamp voltage appropriately, it is possible to suppress the overshoot that may occur immediately after the input voltage is restored.

In the switching power supply device according to one aspect of the present disclosure, for example, the comparison voltage generator may include an amplifier (114 or 214) configured to input and output a current from and to the specific wiring (WR2 or WR3) based on a signal (Verr) generated according to the feedback voltage or based on the feedback voltage.

In the IC 2A of FIG. 3, the comparison voltage generator is configured by the amplifier 114 and the circuit (including the amplifier 111, the phase compensation circuit 112 and the current sensor 113) for generating a signal that serves as a base of the comparison voltage Vc. It can also be understood that the phase compensation circuit 115 of FIG. 3 is also included in the components of the comparison voltage generator. In the IC 2B of FIG. 17, the comparison voltage generator is configured by the amplifier 214. It can also be understood that the phase compensation circuit 215 of FIG. 17 is also included in the components of the comparison voltage generator.

The embodiments of the present disclosure may be appropriately modified in various ways within the scope of the technical idea recited in the claims. The above embodiments are merely examples of the embodiments of the present disclosure. The meanings of the terms of the constituent elements in the present disclosure are not limited to those described in the above embodiments. The specific numerical values shown in the above description are merely examples. As a matter of course, they may be changed to various numerical values.

According to the present disclosure in some embodiments, it is possible to provide a switching power supply device capable of contributing to the suppression of overshoot (e.g., a switching power supply device capable of contributing to the suppression of overshoot which may occur when an input voltage is restored after going through a drop in the input voltage).

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A switching power supply device, comprising:
an output stage circuit including an output transistor installed between an application end of an input voltage and an application end of an output voltage, and configured to generate the output voltage from the input voltage through a switching operation including an operation of switching the output transistor; and
a main control circuit configured to execute PWM control for causing the output stage circuit to perform the switching operation at a predetermined PWM frequency based on a feedback voltage according to the output voltage,
wherein the main control circuit includes:
a comparison voltage generator configured to generate a comparison voltage on a specific wiring according to the feedback voltage;
a phase compensation circuit connected to the specific wiring and configured to compensate a phase of the comparison voltage;
a ramp voltage generation circuit configured to generate a ramp voltage whose voltage value is changed periodically in a PWM cycle; and
a PWM comparator configured to compare the comparison voltage with the ramp voltage to output a signal indicating a comparison result,
wherein the main control circuit is configured to control the output stage circuit based on an output signal of the PWM comparator,
wherein the phase compensation circuit includes a phase compensation resistor installed between the specific wiring and a predetermined node, and a phase compensation capacitor installed between the predetermined node and a reference conductive portion having a predetermined potential, and
wherein the main control circuit further includes a clamp circuit configured to perform a clamping operation for generating a clamp voltage and clamping a voltage at the predetermined node with the clamp voltage.

2. The switching power supply device of claim 1, wherein the main control circuit is configured to:
execute the PWM control or off-skip control for keeping the output transistor in an on-state for more than one cycle of the PWM cycle corresponding to a reciprocal of the PWM frequency;
execute the PWM control for causing the output stage circuit to perform the switching operation based on switching of a high-low relationship between the comparison voltage and the ramp voltage in a state in which the comparison voltage is maintained within a fluctuation range of the ramp voltage;
execute the off-skip control in a state in which the switching of the high-low relationship between the comparison voltage and the ramp voltage does not occur for one cycle or more of the PWM cycle; and
execute the clamping operation in conjunction with the execution of the off-skip control.

3. The switching power supply device of claim 2, wherein upon detecting that the switching of the high-low relationship between the comparison voltage and the ramp voltage does not occur for one cycle of the PWM cycle or more after a start of the PWM control, the main control circuit shifts execution control from the PWM control to the off-skip control and starts the clamping operation, and then upon detecting the switching of the high-low relationship between the comparison voltage and the ramp voltage, the main control circuit returns the execution control to the PWM control and terminates the clamping operation.

4. The switching power supply device of claim 1, wherein the clamp circuit sets the clamp voltage according to the output voltage.

5. The switching power supply device of claim 4, wherein the ramp voltage generation circuit sets an amplitude of the ramp voltage according to the input voltage.

6. The switching power supply device of claim 5, wherein the clamp voltage is proportional to the output voltage, and the amplitude of the ramp voltage is proportional to the input voltage.

7. The switching power supply device of claim 1, wherein the clamp voltage is a predetermined fixed voltage.

8. The switching power supply device of claim 1, wherein the comparison voltage generator includes an amplifier configured to input and output a current from and to the specific wiring based on a signal generated according to the feedback voltage or based on the feedback voltage.

9. The switching power supply device of claim 1, wherein the output stage circuit includes the output transistor and a synchronous rectification transistor directly connected to the output transistor,
wherein the synchronous rectification transistor is installed between the application end of the output voltage and the reference conductive portion, and
wherein the main control circuit is configured to:
in the PWM control, alternately turn on and off the output transistor and the synchronous rectification transistor based on the output signal of the PWM comparator; and
in off-skip control, repeatedly execute a series of unit operations for turning on the output transistor and turning off the synchronous rectification transistor for a time exceeding one cycle of the PWM cycle, and then turning off the output transistor and turning on the synchronous rectification transistor for a time shorter than one cycle of the PWM cycle, or in the off-skip control, maintain the output transistor in an on-state and maintain the synchronous rectification transistor in an off-state.

10. The switching power supply device of claim 1, wherein a coil is installed between the output transistor and the application end of the output voltage, and when the output transistor is turned on, a current based on the input voltage is allowed to flow toward the application end of the output voltage through the output transistor and the coil.

* * * * *